(12) United States Patent
Hasegawa et al.

(10) Patent No.: US 8,211,577 B2
(45) Date of Patent: *Jul. 3, 2012

(54) NONAQUEOUS SOLVENT AND NONAQUEOUS ELECTROLYTIC SOLUTION FOR ELECTRICITY STORAGE DEVICE AND NONAQUEOUS ELECTRICITY STORAGE DEVICE, LITHIUM SECONDARY BATTERY AND ELECTRIC DOUBLE LAYER CAPACITOR USING THE SAME

(75) Inventors: Masaki Hasegawa, Osaka (JP); Takashi Takeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 356 days.

This patent is subject to a terminal disclaimer.

(21) Appl. No.: 12/468,554

(22) Filed: May 19, 2009

(65) Prior Publication Data

US 2009/0297954 A1    Dec. 3, 2009

(30) Foreign Application Priority Data

May 19, 2008  (JP) .................. 2008-131174
May 19, 2008  (JP) .................. 2008-131175

(51) Int. Cl.
    *H01M 6/16*    (2006.01)
(52) U.S. Cl. ........ 429/336; 429/200; 429/199; 429/330; 429/324; 429/188; 252/62.2; 252/364; 570/131; 361/502
(58) Field of Classification Search .................. 429/336, 429/200, 199, 330, 324, 188; 252/62.2, 364; 570/131; 361/502
See application file for complete search history.

(56) References Cited

U.S. PATENT DOCUMENTS

| 6,495,293 | B1 | 12/2002 | Arai et al. |
| 2005/0158623 | A1 | 7/2005 | Matsui et al. |
| 2005/0162813 | A1 | 7/2005 | Fujino |
| 2005/0165260 | A1 | 7/2005 | Lal et al. |
| 2009/0297954 | A1 | 12/2009 | Hasegawa et al. |

FOREIGN PATENT DOCUMENTS

| JP | 2000-223151 | 8/2000 |
| JP | 2000-348762 | 12/2000 |
| JP | 2001-085058 | 3/2001 |
| JP | 2001-143749 | 5/2001 |
| JP | 2004-111359 | 4/2004 |
| JP | 2005-149750 | 6/2005 |
| JP | 2005-206600 | 8/2005 |
| JP | 2005-229103 A | 8/2005 |
| JP | 2005-327785 | 11/2005 |
| JP | 2006-286650 | 10/2006 |
| JP | 2007-224001 | 9/2007 |
| WO | WO 03/058746 A1 | 7/2003 |

OTHER PUBLICATIONS

International Search Report and Written Opinion issued in International Patent Application No. PCT/JP2009/002197, dated Aug. 11, 2009.

*Primary Examiner* — Laura Weiner
(74) *Attorney, Agent, or Firm* — McDermott Will & Emery LLP

(57) ABSTRACT

A nonaqueous solvent for an electricity storage device according to the present invention comprises fluorine-containing cyclic saturated hydrocarbon having a structure which is represented by general formula (1) below and in which one or two substituents R are introduced into a cyclohexane ring (in general formula (1), R is represented by $C_nX_{2n+1}$, n is an integer of 1 or greater, at least one of (2n+1) pieces of X's is F, and the other X's are F or H).

(Chemical formula 7)

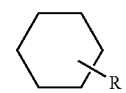

(1)

15 Claims, 7 Drawing Sheets

NONAQUEOUS SOLVENT AND NONAQUEOUS ELECTROLYTIC SOLUTION FOR ELECTRICITY STORAGE DEVICE AND NONAQUEOUS ELECTRICITY STORAGE DEVICE, LITHIUM SECONDARY BATTERY AND ELECTRIC DOUBLE LAYER CAPACITOR USING THE SAME

BACKGROUND OF THE INVENTION

1. Field of the Invention

The present invention relates to a nonaqueous solvent and a nonaqueous electrolytic solution usable for an electricity storage device for storing or accumulating electrochemical energy, and a nonaqueous electricity storage device using the same, such as a lithium secondary battery or an electrical double layer capacitor.

2. Description of the Related Art

Recently, high voltage electricity storage devices in which a charge voltage and a discharge voltage of a single electrical storage element each exceeds 1.5 V have been progressively developed. As such high voltage electricity storage devices, lithium primary batteries, lithium secondary batteries, lithium polymer secondary batteries, electrical double layer capacitors and the like have been put into practice.

For a high voltage electricity storage device, a nonaqueous electrolytic solution using an organic compound as a solvent is used. The reason for this is that water, if used as the solvent of the electrolytic solution, is electrolyzed by the high charge voltage and discharge voltage. A nonaqueous electrolytic solution is also used for an electricity storage device including an electrode which contains active lithium reactive with water and uses occlusion or release of lithium.

The nonaqueous electrolytic solution is desired to have a high conductivity and a low viscosity in order to improve the discharge performance of the electricity storage device in which the nonaqueous electrolytic solution is used. When used as a solvent for a secondary battery, an electrical double layer capacitor or the like, the nonaqueous electrolytic solution needs to be stable chemically and electrochemically in order not to deteriorate the performance of the electricity storage device as a result of the repetition of charge/discharge cycles.

From these points of view, for example, as a main solvent of the electrolytic solution of a lithium ion secondary battery, a mixed system of a cyclic carbonate (carbonic acid ester) represented by ethylene carbonate and a chain carbonate represented by ethylmethyl carbonate or dimethyl carbonate is conventionally used. As a main solvent of the electrolytic solution of an electrical double layer capacitor, a cyclic carbonate represented by propylene carbonate is preferably used. The above-described electricity storage devices are widely used as a main power source, a backup power source or an electric circuit power source for mobile communication devices or portable electronic devices. Such mobile and portable devices are recently desired to be more compact and to have higher performance. Thus, the electricity storage devices are required to be further improved in the volumetric energy density.

In order to improve the volumetric energy density, it is necessary to improve the average discharge voltage and the volumetric capacity density. As one measure for realizing this, it is proposed to increase the charge voltage.

In the case of a lithium ion secondary battery, the utilization factor of lithium as a positive electrode material can be improved by raising the charge voltage. As a result, the volumetric capacity density is increased. As the positive electrode material, a lithium-containing transition metal oxide such as lithium cobalt oxide, lithium nickel oxide or the like is generally used. In the case of an electrical double layer capacitor, the value of the electrical double layer capacity can be increased by raising the charge voltage. As a result, the volumetric capacity density can be increased.

However, in the case where one of a pair of electrodes is charged to a level equal to or higher than 4.3V on the basis of the dissolution deposition potential of lithium, the following occurs. Even when a conventional chain carbonate or cyclic carbonate which is known to be superb in oxidation resistance and so usable as a nonaqueous solvent suitable to a high voltage electricity storage device is used, such a carbonate is oxidized and decomposed to generate gas. Such a decomposition reaction conspicuously proceeds especially in a high temperature state and is accompanied by generation of a large amount of gas. Therefore, for example, where an internal-pressure-sensitive current interrupt device (CID) for blocking the charging current against excessive charge of a battery is mounted on a high voltage lithium ion secondary battery containing such a nonaqueous solvent, the CID may malfunction to cause the lithium ion secondary battery to lose the function as a battery. In the case where the CID is not mounted, a problem arises that when the amount of gas generation is excessive, the battery is swollen.

Japanese Laid-Open Patent Publication No. 2005-149750 discloses a nonaqueous electrolytic secondary battery using a nonaqueous electrolytic solution containing cyclic sulfonic acid ester in order to suppress the chain carbonate or the cyclic carbonate from being oxidized and decomposed at a super high potential. In such a nonaqueous electrolytic secondary battery, when the positive electrode is charged to a potential equal to or higher than 4.5 V, the cyclic sulfonic acid ester is oxidized and decomposed on the positive electrode, and a surface of the positive electrode is covered with a film. This film suppresses the solvent from being decomposed on the surface of the positive electrode.

Japanese Laid-Open Patent Publications Nos. 2004-111359 and 2006-286650 propose incorporating, into a nonaqueous solvent, a "hydrocarbon compound which may contain a fluorine atom" at 0.01% by weight or greater and 5% by weight or less. These patent documents describe that because a hydrocarbon compound which is stable against oxidation and reduction is present at an activation point on the surface of the electrode, sub reaction of the electrolytic solution component and the electrode active material can be suppressed in a high temperature state.

The nonaqueous electrolytic secondary battery disclosed in Japanese Laid-Open Patent Publication No. 2005-149750 suppresses the decomposition reaction of the chain carbonate or the cyclic carbonate, but the effect thereof is not sufficient. In addition, because the film is formed on the surface of the positive electrode, the charge transfer resistance is increased on the interface of the positive electrode active material. This causes problems of raising the internal resistance of the battery and also reducing the high rate discharge performance.

Japanese Laid-Open Patent Publications Nos. 2004-111359 and 2006-286650 describe that the nonaqueous electrolytic secondary battery disclosed in these patent publications can suppress the sub reaction of the electrolytic solution component and the electrode active material in a high temperature state owing to a "hydrocarbon compound which may contain a fluorine atom". However, the content of the hydrocarbon compound is as low as 5% by weight or less. In addition, the hydrocarbon compound does not have a property of, for example, adsorbing to, or coordinating at, the surface of the positive electrode. Therefore, the hydrocarbon compound does not selectively exist at a high concentration on the surface of the positive electrode. For these reasons, the nonaqueous electrolytic secondary batteries described in Japanese Laid-Open Patent Publications Nos. 2004-111359 and 2006-286650 are not considered to sufficiently provide the effect of suppressing the sub reaction.

SUMMARY OF THE INVENTION

In light of the above-described conventional art, the present invention has an object of providing a nonaqueous solvent and a nonaqueous electrolytic solution for an electricity storage device which have a superb oxidation resistance. The present invention also has an object of providing a nonaqueous solvent and a nonaqueous electrolytic solution for an electricity storage device which generate little gas even if being decomposed. The present invention further has an object of providing an electricity storage device which uses such a nonaqueous solvent and a nonaqueous electrolytic solution and thus has a superb charge/discharge characteristic even when being charged at a high voltage and exhibits a high reliability for a long time even in a high temperature state.

A nonaqueous solvent for an electricity storage device according to the present invention comprises fluorine-containing cyclic saturated hydrocarbon having a structure which is represented by general formula (1) below and in which one or two substituents R are introduced into a cyclohexane ring. In general formula (1), R is represented by $C_nX_{2n+1}$, n is an integer of 1 or greater, at least one of (2n+1) pieces of X's is F, and the other X's are F or H.

(Chemical formula 1)

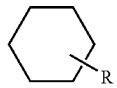

(1)

In a preferable embodiment, n is 1 or 2.

In a preferable embodiment, the nonaqueous solvent for an electricity storage device further comprises a compound having a relative dielectric constant of 25 or higher.

In a preferable embodiment, the compound having a relative dielectric constant of 25 or higher is a carbonate or a sulfone.

In a preferable embodiment, the compound having a relative dielectric constant of 25 or higher is a cyclic carbonate.

In a preferable embodiment, the compound having a relative dielectric constant of 25 or higher is a sulfone compound represented by general formula (2) below. $R_1$ and $R_2$ are independently an alkyl group having a carbon number of 1 or greater and 4 or smaller, and may be bonded to each other to form a cyclic structure.

(Chemical formula 2)

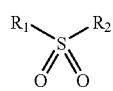

(2)

In a preferable embodiment, the sulfone compound is formed of at least one of a chain sulfone and a cyclic sulfone.

In a preferable embodiment, the chain sulfone is an asymmetric chain sulfone.

In a preferable embodiment, the fluorine-containing cyclic saturated hydrocarbon is contained as a solvent component at 10% by weight or greater and 100% by weight or less.

A nonaqueous electrolytic solution for an electricity storage device according to the present invention comprises the nonaqueous solvent for an electricity storage device defined in any of the above; and a supporting electrolyte salt.

In a preferable embodiment, the supporting electrolyte salt is a lithium salt.

In a preferable embodiment, the supporting electrolyte salt is a quaternary ammonium salt.

An electricity storage device according to the present invention comprises the nonaqueous solvent for an electricity storage device or the nonaqueous electrolytic solution for an electricity storage device defined in any of the above.

A lithium ion secondary battery according to the present invention comprises the nonaqueous solvent for an electricity storage device or the nonaqueous electrolytic solution for an electricity storage device defined in any of the above.

An electrical double layer capacitor according to the present invention comprises the nonaqueous solvent for an electricity storage device or the nonaqueous electrolytic solution for an electricity storage device defined in any of the above.

A nonaqueous solvent and a nonaqueous electrolytic solution for an electricity storage device according to the present invention contain fluorine-containing cyclic saturated hydrocarbon and therefore have a high oxidation resistance, and compatibility with organic solvents which are generally used for an electricity storage device. Fluorine-containing cyclic saturated hydrocarbon does not contain oxygen, and therefore does not generate almost any gas by oxidation and decomposition. The nonaqueous solvent and the nonaqueous electrolytic solution for an electricity storage device according to the present invention further comprise a compound having a relative dielectric constant of 25 or higher, and therefore can dissolve a supporting electrolyte salt at a high concentration.

Accordingly, a nonaqueous solvent and a nonaqueous electrolytic solution for an electricity storage device according to the present invention have a superb oxidation resistance at a high voltage, and have a high ion conductivity. An electricity storage device according to the present invention such as a lithium ion secondary battery, an electrical double layer capacitor or the like has a superb charge/discharge characteristic even being charged at a high voltage and also exhibits a high reliability for a long time even in a high temperature state.

Figure 1A:
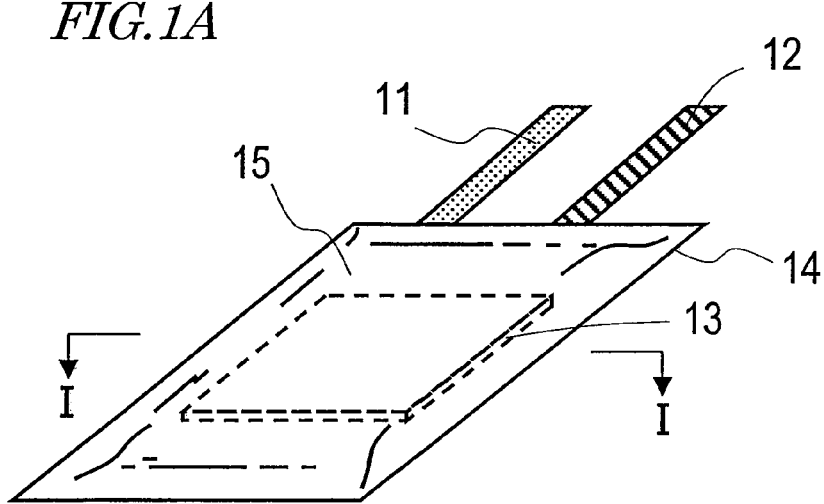
FIG. 1A is a perspective view showing an embodiment of a lithium ion secondary battery according to the present invention.

DETAILED DESCRIPTION OF PREFERRED EMBODIMENTS (Embodiment 1)

Hereinafter, an Embodiment of a Nonaqueous Solvent for an electricity storage device according to the present invention will be described. The nonaqueous solvent in this embodiment is used for an electricity storage device such as a lithium ion secondary battery, an electrical double layer capacitor or the like.

The nonaqueous solvent for an electricity storage device in this embodiment contains fluorine-containing cyclic saturated hydrocarbon represented by the following general formula (1). The fluorine-containing cyclic saturated hydrocarbon has a structure in which one or greater and two or less substituents R are introduced into a cyclohexane ring.

The substituent R is represented by $C_nX_{2n+1}$. n is an integer of 1 or greater. At least one of (2n+1) pieces of X's is F, and the other X's are F or H.

The fluorine-containing cyclic saturated hydrocarbon represented by the general formula (1) has an oxidation/reduction potential which is higher than that of a chain carbonate or a cyclic carbonate, specifically, an oxidation/reduction potential equal to or greater than 4.3 V. This improves the oxidation resistance of the nonaqueous solvent for an electricity storage device. The fluorine-containing cyclic saturated hydrocarbon represented by the general formula (1) does not generate $CO_2$ even if being decomposed.

(Chemical formula 3)

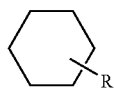

(1)

In general, saturated hydrocarbon has a high oxidation resistance. However, due to its properties of having a low dielectric constant and a low compatibility with a polar solvent, saturated hydrocarbon has been conventionally considered to be difficult to be used as a nonaqueous solvent for an electricity storage device. Therefore, as described in Japanese Laid-Open Patent Publications Nos. 2004-111359 and 2006-286650, saturated hydrocarbon is conventionally proposed to be used merely in a limited manner, e.g., to be contained in the solvent at a small amount equal to or less than 5% by weight.

However, as described in detail in the following examples, the present inventors found that cyclohexane having, as a substituent, a hydrocarbon group in which hydrogen is substituted with fluorine has a low molecule symmetry, a superb compatibility with a polar solvent owing to having a dipole moment equal to or greater than 1.6 debye, and a superb oxidation resistance owing to having a cyclic saturated hydrocarbon structure.

The fluorine-containing cyclic saturated hydrocarbon represented by general formula (1) does not have any functional group poor in oxidation stability in a molecule thereof, and so is superb in oxidation stability. In addition, a fluorine atom bonded to the substituent R has a strong electron absorbing effect, and so the oxidation resistance of the cyclic saturated hydrocarbon can be improved as compared to that of hydrocarbon without hydrogen being substituted with fluorine. The cyclic saturated hydrocarbon is preferably cyclohexane because cyclohexane is liquid in a temperature range in which the electricity storage device is used and cyclohexane is easily available and easy to handle.

As compared to a compound in which a fluorine atom is directly bonded to a cyclohexane ring, such as 1,1,2,2,3,3,4-heptafluorocyclopentane, a compound represented by general formula (1) in which fluorine is bonded to the substituent R has a lower symmetry of molecule. Therefore, the compound represented by general formula (1) has a relatively large polarity and dielectric constant. For these reasons, the fluorine-containing cyclic saturated hydrocarbon represented by general formula (1) is superb in compatibility with a polar solvent.

As the number of fluorine atoms bonded to the substituent R is larger, the substituent R absorbs more electrons from the cyclohexane ring, and so the oxidation resistance of the cyclohexane ring is more improved. Accordingly, it is more preferable that the substituent R is a trifluoromethyl group or a pentafluoroethyl group.

The number of the substituents R is preferably one or two. In the case where there are two substituents R, there is no specific limitation on the position of the cyclohexane ring to which each substituent R is to be introduced. For decreasing the melting point, it is preferable that the hydrocarbon has a molecular structure in which a carbon atom adjacent to a carbon atom bonded to one substituent R is bonded to the other substituent R. It is more preferable that the hydrocarbon has a molecular structure in which the two substituents R are bonded to one carbon atom.

In the case where there are two substituents R, the two substituents R may have the same structure as each other or have different structures from each other. In the case where there are more than two substituents R, the molecular weight is large and so the mobility of molecules is decreased. Where the substituents R are excessively large, the molecular weight is excessively large, which decreases the mobility of molecules. For these reasons, the carbon number (n) of R is preferably 1 or 2.

Specific compounds of the fluorine-containing cyclic saturated hydrocarbon represented by general formula (1) include, for example, fluoromethylcyclohexane, difluoromethylcyclohexane, trifluoromethylcyclohexane, (2-fluoroethyl)cyclohexane, (2,2-difluoroethyl)cyclohexane, (2,2,2-trifluoroethyl)cyclohexane, (1-fluoroethyl)cyclohexane, (1,2-difluoroethyl)cyclohexane, (1,2,2-trifluoroethyl)cyclohexane, (1,2,2,2-tetrafluoroethyl)cyclohexane, (1,1-difluoroethyl)cyclohexane, (1,1,2-trifluoroethyl)cyclohexane, (1,1,2,2-tetrafluoroethyl)cyclohexane, (pentafluoroethyl)cyclohexane, 1,1-bis(trifluoromethyl)cyclohexane, 1,2-bis(trifluoromethyl)cyclohexane, 1,3-bis(trifluoromethyl)cyclohexane, 1,4-bis(trifluoromethyl)cyclohexane, 1,1-bis(pentafluoroethyl)cyclohexane, 1,2-bis(pentafluoroethyl)cyclohexane, 1,3-bis(pentafluoroethyl)cyclohexane, 1,4-bis(pentafluoroethyl)cyclohexane, and the like.

From the point of view of oxidation resistance, it is especially preferable to use, as the fluorine-containing cyclic saturated hydrocarbon, trifluoromethylcyclohexane, (pentafluoroethyl)cyclohexane, 1,1-bis(trifluoromethyl)cyclohexane, 1,1-bis(pentafluoroethyl)cyclohexane, 1,2-bis(trifluoromethyl)cyclohexane, 1,3-bis(trifluoromethyl)cyclohexane, or 1-(pentafluoroethyl)-1-(trifluoromethyl)cyclohexane. These compounds can be synthesized by fluoriding corresponding alkylcyclohexane or alkylcyclohexane having a leaving group (I, Cl, OH, etc.) at a site to which a fluorine atom is to be introduced, by a fluorinating method using $F_2$, $NF_3$ or DAST ((diethylamino)sulfur trifluoride).

For the above-described reasons, the nonaqueous solvent for an electricity storage device in this embodiment has a high oxidation resistance. The nonaqueous solvent for an electricity storage device in this embodiment also has a superb compatibility with an organic solvent generally used as a nonaqueous electrolytic solution for an electricity storage device, and so can be incorporated at a high ratio into the nonaqueous electrolytic solution for an electricity storage device. Accordingly, the oxidation resistance of the nonaqueous electrolytic solution can be improved by using the nonaqueous solvent for an electricity storage device in this embodiment as a nonaqueous electrolytic solution for an electricity storage device or by incorporating the nonaqueous solvent for an electricity storage device in this embodiment into a nonaqueous electrolytic solution for an electricity storage device.

The solvent for an electricity storage device in this embodiment does not generate $CO_2$ even if being oxidized and decomposed. Therefore, an electricity storage device using the nonaqueous solvent for an electricity storage device in this embodiment can avoid the problems that the safety mechanism (CID) is actuated, or the battery is swollened, due to the oxidation and decomposition of the solvent.

The oxidation of the nonaqueous electrolytic solution in an electricity storage device is dominated by the reaction rate which depends on the concentration. Therefore, the above-described effects are provided in accordance with the ratio of the solvent incorporated into the nonaqueous electrolytic solution. Accordingly, as long as the electricity storage device includes the nonaqueous solvent in this embodiment, the oxidation resistance of the nonaqueous electrolytic solution of the electricity storage device is improved and the generation of gas is suppressed. In order to conspicuously provide the effect of the present invention, it is preferable that the fluorine-containing cyclic saturated hydrocarbon compound represented by general formula (1) is contained in the solvent at a content of 5% by weight or greater and 100% by weight or less, and more preferably at a content of 10% by weight or greater and 100% by weight or less. Where the content in the solvent is 10% by weight or greater, the oxidation of the nonaqueous electrolytic solution is effectively suppressed and the amount of gas generation is decreased.

The nonaqueous solvent for an electricity storage device in this embodiment is preferably usable for a device of a high charge voltage (super high voltage-type nonaqueous-system electricity storage device). Especially where the nonaqueous solvent for an electricity storage device in this embodiment is used for an electricity storage device such as a lithium ion secondary battery or an electrical double layer capacitor, the nonaqueous electrolytic solution is suppressed from being deteriorated by oxidation as a result of high voltage operation, high temperature storage and long-time repetition of charge/discharge cycles.

When being used as a nonaqueous electrolytic solution for an electricity storage device such as a lithium ion secondary battery or an electrical double layer capacitor, the solvent in this embodiment is usable as being mixed with a known supporting electrolyte salt or solvent. There is no specific limitation on the type of the supporting electrolyte salt or solvent with which the solvent in this embodiment is to be mixed.

Generally as the supporting electrolyte salt, a salt formed of an anion and a cation is used. Examples of the anion include halide anion, perchloric acid anion, trifluoromethanesulfonic acid anion, tetrafluoroboric acid anion, hexafluorophosphoric acid anion, trifluoromethanesulfonic acid anion, nonafluoro-1-butanesulfonic acid anion, bis(trifluoromethanesulfonyl)imide anion, bis(pentafluoroethylsulfonyl)imide anion, and the like. Examples of the cation include alkaline metal cations such as lithium, sodium, potassium and the like; alkaline earth metal cations such as magnesium and the like; quaternary ammonium cations such as tetraethylammonium, 1,3-ethylmethylimidazolium (EMI) and the like; etc.

Usable salts formed of any of the above-described anions and any of the above-described cations include lithium salts such as $LiClO_4$, $LiBF_4$, $LiPF_6$, $LiCF_3SO_3$, $LiN(CF_3SO_2)_2$ and the like; quaternary ammonium salts such as $(C_2H_5)_4NBF_4$, $(C_4H_9)_4NBF_4$, $(C_2H_5)_3CH_3NBF_4$, $(C_2H_5)_4NPF_6$, $(C_2H_5)_3CH_3N-N(SO_2CF_3)_2$, $(C_2H_5)_4N-N(SO_2CF_3)_2$, and the like; and mixtures thereof.

Examples of the solvents to be mixed with the solvent in this embodiment include cyclic carbonates such as ethylene carbonate, propylene carbonate, butylene carbonate, vinylene carbonate, and the like; chain carbonates such as dimethyl carbonate, diethyl carbonate, ethylmethyl carbonate, dipropyl carbonate, and the like; etc.

(Embodiment 2)

Hereinafter, Embodiment 2 of the nonaqueous solvent for an electricity storage device according to the present invention will be described. The nonaqueous solvent for an electricity storage device in this embodiment contains a compound having a relative dielectric constant of 25 or higher in addition to the fluorine-containing cyclic saturated hydrocarbon represented by general formula (1) described in Embodiment 1. Owing to this structure, the nonaqueous solvent in this embodiment provides an effect of being superb in solubility in a supporting electrolyte salt in addition to the effects provided by the nonaqueous solvent for an electricity storage device according to Embodiment 1.

The fluorine-containing cyclic saturated hydrocarbon represented by general formula (1) is as described in Embodiment 1.

The "compound having a relative dielectric constant of 25 or higher" refers to a compound having a relative dielectric constant of 25 or higher in the temperature range of 25° C. to 40° C. In general, a solvent having a relative dielectric constant of 25 or higher has a polarity sufficient to dissociate the supporting electrolyte salt and so is suitable to the nonaqueous electrolytic solution for an electricity storage device. In the nonaqueous electrolytic solution for an electricity storage device in this embodiment also, the compound having a relative dielectric constant of 25 or higher provides the nonaqueous solvent for an electricity storage device with a function of dissociating the supporting electrolyte salt.

The compound having a relative dielectric constant of 25 or higher is preferably a carbonate or a sulfone. Examples of the carbonate having a relative dielectric constant of 25 or higher include cyclic carbonates such as ethylene carbonate, propylene carbonate, butylene carbonate and the like. The above-described carbonate fluorides such as fluoroethylene carbonate, fluoropropylene carbonate and the like are also usable.

As the sulfone, a compound represented by general formula (2) is usable.

(Chemical formula 4)

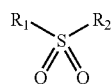

(2)

In the above formula, $R_1$ and $R_2$ an alkyl group or an alkylene group having a carbon number of 1 or greater and 4 or less. $R_1$ and $R_2$ may not be bonded to each other in a chain structure, or may be bonded to each other to form a cyclic structure. More specifically, the compound represented by general formula (2) may be sulfolane (SLF) in which $R_1$ and $R_2$ are each a methylene group ($CH_2$) and are bonded to each other to form a 5-member ring containing S, 3-methylsulfolane (3-MeSLF) in which one hydrogen of sulfolane is substituted with a methyl group, or isopropylmethylsulfone (iPrMeSF) in which $R_1$ is an isopropyl group and $R_2$ is a methyl group.

The compound having a relative dielectric constant of 25 or higher may be gamma-butyrolactone. The nonaqueous solvent for an electricity storage device in this embodiment may contain two or more types of the compounds having a relative dielectric constant of 25 or higher.

The relative dielectric constants of these compounds are shown in Table 1. In Table 1, the relative dielectric constant values without the temperature specifically being presented are values at 25° C., and the relative dielectric constant values with the temperature are values at such respective temperatures. As shown in Table 1, the relative dielectric constants of these compounds are 25 or higher in the temperature range of 25° C. to 40° C.

TABLE 1

| Compound having a relative dielectric constant of 25 or higher | Relative dielectric constant (25° C.) |
| --- | --- |
| Ethylene carbonate | 90 (40° C.) |
| Propylene carbonate | 65 |
| Butylene carbonate | 53 |
| Gamma-butyrolactone | 39 |
| Sulfolane | 43 (30° C.) |
| 3-methylsulfolane | 29 |
| Isopropylmethylsulfone | 56 |

The "hydrocarbon compound which may contain a fluorine atom" described in Japanese Laid-Open Patent Publications Nos. 2004-111359 and 2006-286650 is low in compatibility with carbonate-based compounds, and is contained in the solution at a content of only 0.01% by weight or greater and 5% by weight or less. By contrast, the fluorine-containing cyclic saturated hydrocarbon in this embodiment is high in compatibility with the compounds having a relative dielectric constant of 25 or higher and so can be contained in the solution at a higher content. Therefore, the fluorine-containing cyclic saturated hydrocarbon in this embodiment can provide a more significant effect in both oxidation resistance and ion conductivity.

In the case where the fluorine-containing cyclic saturated hydrocarbon compound represented by general formula (1) is contained in the solvent at 5% by weight or greater, the oxidation of the nonaqueous electrolytic solution is effectively suppressed. By contrast, in the case where being contained in the solvent at 50% or less, the fluorine-containing cyclic saturated hydrocarbon compound is easily compatible with a compound having a relative dielectric constant of 25 or higher. Accordingly, the fluorine-containing cyclic saturated hydrocarbon compound is more preferably contained in the solvent at 5% by weight or greater and 50% by weight or less. In the case where being contained in the solvent at 10% by weight or greater and 30% by weight or less, the fluorine-containing cyclic saturated hydrocarbon compound provides a more efficient discharge characteristic and is more easily compatible with a compound having a relative dielectric constant of 25 or higher.

Owing to the fluorine-containing cyclic saturated hydrocarbon, the nonaqueous solvent for an electricity storage device in this embodiment provides a high oxidation resistance. Owing to the compound having a relative dielectric constant of 25 or higher, the nonaqueous solvent for an electricity storage device in this embodiment can dissolve and dissociate a supporting electrolyte salt such as a lithium salt, a quaternary ammonium salt or the like at a sufficient concentration. This maintains the ion conductivity high.

In general, a compound having a relative dielectric constant of 25 or higher has a high viscosity. Therefore, in a solvent using such a compound independently, ion conduction is likely to be obstructed and thus it is difficult to provide a high ion conductivity. By contrast, the viscosity of the fluorine-containing cyclic saturated hydrocarbon is low. Mixing a compound having a relative dielectric constant of 25 or higher with the fluorine-containing cyclic saturated hydrocarbon provides an effect of further improving the ion conductivity.

The nonaqueous solvent for an electricity storage device in this embodiment is usable for a device of a high charge voltage exceeding 4.3 V (super high voltage-type nonaqueous-system electricity storage device). Especially where the nonaqueous solvent for an electricity storage device in this embodiment is used for an electricity storage device such as a lithium ion secondary battery or an electrical double layer capacitor, the nonaqueous electrolytic solution is suppressed from being deteriorated by oxidation as a result of high voltage operation, high temperature storage and long-time repetition of charge/discharge cycles.

The solvent for an electricity storage device in this embodiment does not generate $CO_2$ even if being oxidized and decomposed. Therefore, an electricity storage device using the nonaqueous solvent for an electricity storage device in this embodiment can avoid the problems that the safety mechanism (CID) is actuated, or the battery is swollened, due to the oxidation and decomposition of the solvent.

(Embodiment 3)

Hereinafter, an embodiment of a nonaqueous electrolytic solution for an electricity storage device according to the present invention will be described. The nonaqueous electrolytic solution for an electricity storage device in this embodiment is used for an electricity storage device such as a lithium ion secondary battery, an electrical double layer capacitor or the like.

The nonaqueous electrolytic solution in this embodiment includes a nonaqueous solvent and a supporting electrolyte salt dissolved in the nonaqueous solvent. As the nonaqueous solvent, any of the nonaqueous solvents described in Embodiment 2 is usable. As the supporting electrolyte salt, any general supporting electrolyte salt is usable in accordance with the type of the electricity storage device.

Examples of the supporting electrolyte salt usable in the case where the nonaqueous electrolytic solution in this embodiment is used for a lithium ion secondary battery include lithium salts such as $LiPF_6$, $LiBF_4$, $LiAsF_6$, $LiClO_4$, LiCF$_3$SO$_3$, LiSbF$_6$, LiSCN, LiCl, LiC$_6$H$_5$SO$_3$, LiN(CF$_3$SO$_2$)$_2$, LiC(CF$_3$SO$_2$)$_3$, C$_4$F$_9$SO$_3$Li and the like; and mixtures thereof.

Examples of the supporting electrolyte salt usable in the case where the nonaqueous electrolytic solution in this embodiment is used for an electrical double layer capacitor include, in addition to the lithium salts mentioned above, quaternary ammonium salts such as (C$_2$H$_5$)$_4$NBF$_4$, (C$_4$H$_9$)$_4$NBF$_4$, (C$_2$H$_5$)$_3$CH$_3$NBF$_4$, (C$_2$H$_5$)$_4$NPF$_6$, (C$_2$H$_5$)$_3$CH$_3$N—N(SO$_2$CF$_3$)$_2$, (C$_2$H$_5$)$_4$N—N(SO$_2$CF$_3$)$_2$, and the like; and mixtures thereof.

Owing to containing a compound having a relative dielectric constant of 25 or higher, the nonaqueous electrolytic solution in this embodiment can dissolve and dissociate the supporting electrolyte salt at a sufficient concentration. Owing to the fluorine-containing cyclic saturated hydrocarbon, the nonaqueous electrolytic solution in this embodiment has a high oxidation resistance. Therefore, the nonaqueous electrolytic solution in this embodiment is usable for a device of a high charge voltage exceeding 4.3V (super high voltage-type nonaqueous-system electricity storage device).

(Embodiment 4)

Hereinafter, an embodiment of an electricity storage device according to the present invention will be described. The electricity storage device in this embodiment is a lithium ion secondary battery.

Figure 1B:
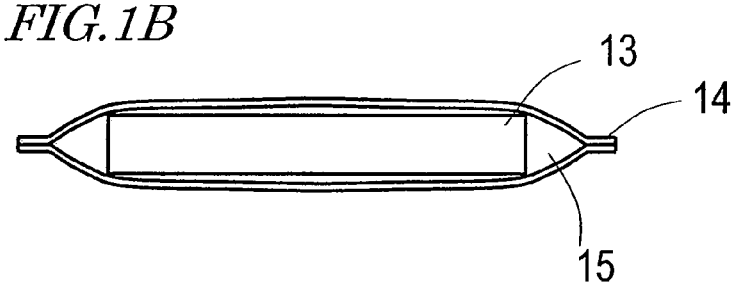
FIG. 1B is a cross-sectional view of FIG. 1A taken along line I-I in FIG. 1A.

As shown in FIGS. 1A and 1B, the lithium ion secondary battery in this embodiment includes an electrode unit 13, a battery case 14 for accommodating the electrode unit 13, and a nonaqueous electrolytic solution 15 filling the battery case 14. A positive electrode in the electrode unit 13 is connected to a positive electrode lead 11, and a negative electrode in the electrode unit 13 is connected to a negative electrode lead 12. The positive electrode lead 11 and the negative electrode lead 12 are extended outside the battery case 14.

As the nonaqueous electrolytic solution 15, any nonaqueous electrolytic solution described in Embodiment 3 as usable for a lithium ion secondary battery is used. For example, a solvent containing propylene carbonate (PC) (commercially available battery grade) and trifluoromethylcyclohexane (TFMCH) mixed at a ratio of 85:15 is used. In this solvent, LiPF$_6$ (commercially available battery grade) is dissolved as the supporting electrolyte salt at a concentration of 0.5 mol/L.

Figure 1C:
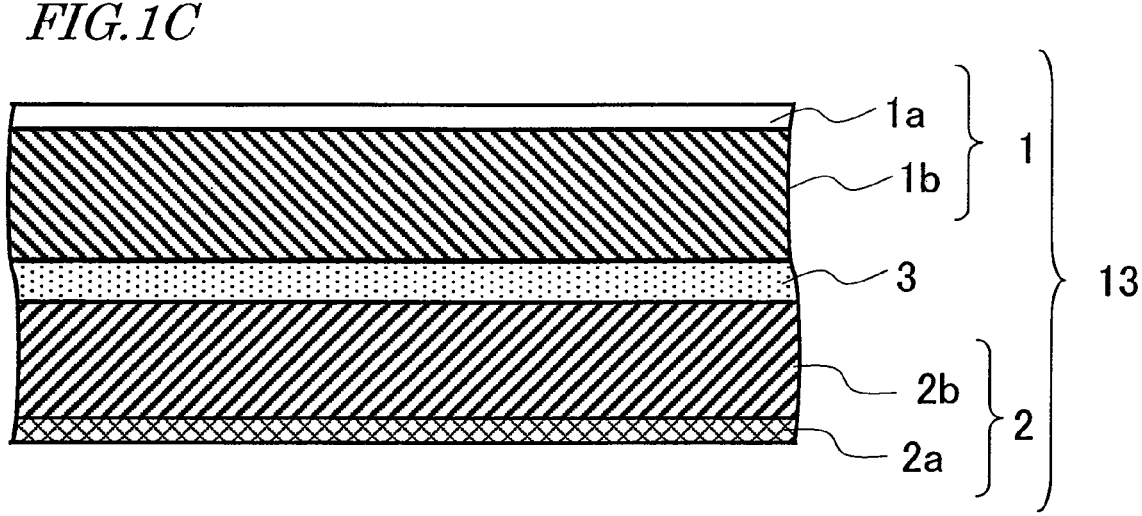
FIG. 1C is an enlarged cross-sectional view of an electrode unit 13 shown in FIG. 1A and FIG. 1B.

As shown in FIG. 1C, the electrode unit 13 includes a positive electrode 1, a negative electrode 2 and a separator 3 provided between the positive electrode 1 and the negative electrode 2. The positive electrode 1 includes a positive electrode current collector 1a formed of an aluminum foil and a positive electrode active material layer 1b formed of LiCoO$_2$ applied on a surface of the positive electrode current collector 1a. The negative electrode 2 includes a negative electrode current collector 2a formed of a stainless steel (SUS304) mesh and metal lithium 2b pressure-contacted on a surface of the negative electrode current collector 2a. The separator 3 is formed of, for example, a polyethylene microporous sheet.

A material of the positive electrode active material layer 1b may be a lithium-containing transition metal oxide other than LiCoO$_2$. Examples of the usable material include Li$_x$CoO$_2$, Li$_x$NiO$_2$, Li$_x$MnO$_2$, Li$_x$Co$_y$Ni$_{1-y}$O$_2$, Li$_x$Co$_y$M$_{1-y}$O$_z$, Li$_x$Ni$_{1-y}$M$_y$O$_z$, Li$_x$Mn$_2$O$_4$, and Li$_x$Mn$_{2-y}$M$_y$O$_4$ (M=at least one of Na, Mg, Sc, Y, Mn, Fe, Co, Ni, Cu, Zn, Al, Cr, Pb, Sb, and B; x=0 to 1.2; y=0 to 0.9; z=1.7 to 2.3). Any other material which makes the potential of the positive electrode 1 at the time of charge exceed 4 V on the lithium basis is usable. A plurality of different materials may be mixed as the positive electrode active material. In the case where the positive electrode active material is powdery, the average particle diameter is not specifically limited but is especially preferably 0.1 to 30 μm. The positive electrode active material layer 1b usually has a thickness of about 50 μm to 200 μm, but is not specifically limited regarding the thickness. The positive electrode active material layer 1b may have a thickness of 0.1 μm to 50 μm.

The positive electrode active material layer 1b may contain both of, or either one of, a conductor and a binder other than the active material. The positive electrode active material layer 1b may contain neither a conductor nor a binder and may be formed only of an active material.

The conductor for the positive electrode 1 may be any electron-conductive material which does not cause any chemical change at the charge/discharge potential of the positive electrode 1. For example, any of conductive fibers such as graphite, carbon black, carbon fiber, metal fiber and the like; metal powders, conductive whiskers, conductive metal oxides; organic conductive materials and the like may be used independently or as a mixture of two or more. The amount of the conductor is not specifically limited, but is preferably 1 to 50% by weight, and especially preferably 1 to 30% by weight with respect to the positive electrode material.

The binder usable for the positive electrode 1 may be a thermoplastic resin or a thermosetting resin. Preferable examples of the binder include polyolefin resins such as polyethylene, polypropylene and the like; fluorine-based resins such as polytetrafluoroethylene (PTFE), poly(vinylidene fluoride) (PVDF), hexafluoropropylene (HFP) and the like; copolymeric resins thereof; polyacrylic acids; and copolymeric resins thereof.

In addition to the conductor and the binder, various other additives including a filler, a dispersant, an ion conductor, a pressure increasing agent, and the like may be used. A filler may be any fibrous material which does not cause any chemical change in the lithium ion secondary battery.

The material of the positive electrode current collector 1a may be anything which does not cause any chemical change at the charge/discharge potential of the positive electrode 1. Examples of the usable material include stainless steel, aluminum, titanium, carbon, conductive resins, and the like. The surface of the positive electrode current collector 1a is preferably surface-treated to have concaves and convexes. The form of the positive electrode current collector 1a may be either foil, film, sheet, net, punched, lath, porous, foamed, fibrous, molded nonwoven cloth or the like. The thickness of the positive electrode current collector 1a is not specifically limited, but is generally 1 to 500 μm.

The material of the negative electrode active material layer 2b may be any of carbon materials such as various types of natural graphite, various types of artificial graphite, graphitizing carbon, non-graphitizing carbon and the like, or mixtures thereof; composite materials containing silicon or tin capable of reversibly occluding/releasing lithium; or various alloy materials. It is preferable to use, for example, at least one selected from the group consisting of a silicon, a silicon alloy, a compound containing silicon and oxygen, a compound containing silicon and nitrogen, a tin, a tin alloy, a compound containing tin and oxygen, and a compound containing tin and nitrogen. In addition, an oxide material capable of reversibly occluding/releasing lithium, such as lithium titanate or the like is usable.

A material usable for the negative electrode current collector 2a may be, for example, copper foil, nickel foil, stainless steel foil or the like.

The nonaqueous electrolytic solution 15 is unlikely to be oxidized and decomposed even if being supplied with a high charge voltage, and so is usable for a device of a high charge voltage exceeding 4.3V (super high voltage-type nonaqueous-system electricity storage device).

FIG. 1 shows a sheet-type lithium ion secondary battery, but the lithium ion secondary battery in this embodiment may have any other shape, and may be, for example, cylindrical, prismatic, or large to be used for an electric automobile or the like.

The lithium ion secondary battery in this embodiment is usable for mobile information terminals, mobile electronic devices, home-use compact power storage devices, motorcycles, electric vehicles, hybrid electric vehicles, and the like, as well as other devices.

(Embodiment 5)

Hereinafter, an embodiment of an electricity storage device according to the present invention will be described. The electricity storage device in this embodiment is an electrical double layer capacitor.

Figure 2:
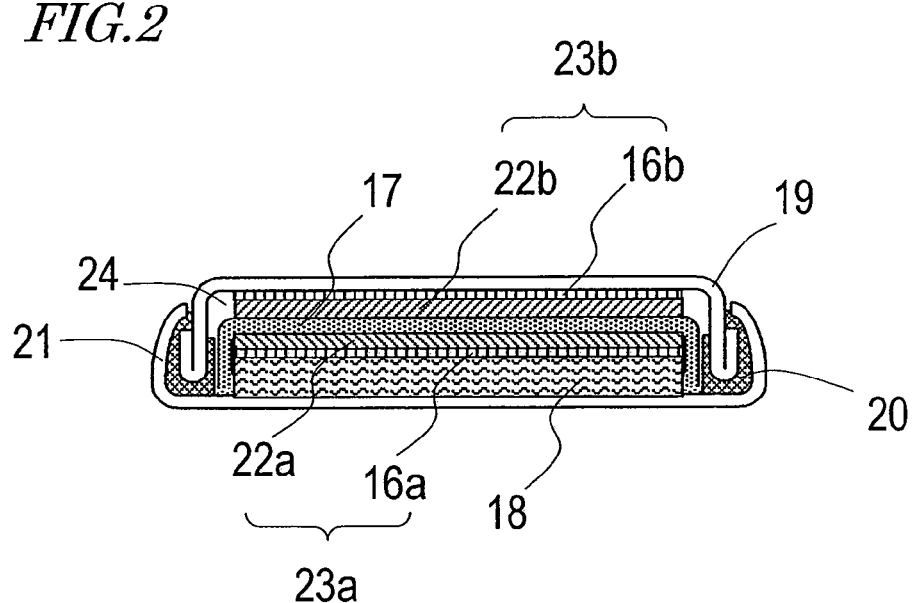
FIG. 2 is a cross-sectional view showing an embodiment of an electrical double layer capacitor according to the present invention.

As shown in FIG. 2, the electrical double layer capacitor includes disc-shaped electrodes 23a and 23b facing each other and a separator 17 located between the two electrodes 23a and 23b. The electrode 23a includes a current collector 16a and an electrode mixer 22a provided on a surface of the current collector 16a. Similarly, the electrode 23b includes a current collector 16b and an electrode mixer 22b provided on a surface of the current collector 16b. The current collectors 16a and 16b are formed of, for example, an aluminum foil, and the electrode mixers 22a and 22b contains, for example, activated carbon.

An electrode unit including the electrodes 23a and 23b and the separator 17 is accommodated in a case 21 having a circular bottom. On a bottom surface of the case 21, a spacer 18 is located, and the electrode unit is placed on the spacer 18. The case 21 is opened at the top and is covered with a sealing plate 19. A gap between the case 21 and the sealing plate 19 is filled with a gasket 20.

The inside of the case 21 and the sealing plate 19 is impregnated with a prescribed amount of nonaqueous electrolytic solution 24. As the nonaqueous electrolytic solution 24, any of the materials described in Embodiment 3 as being usable for the electrical double layer capacitor is used. For example, the nonaqueous electrolytic solution 24 contains a mixture solvent of propylene carbonate (PC) and trifluoromethylcyclohexane (TFMCH) mixed at a weight ratio of 80:20 and 0.2 mol/L of $(C_2H_5)_4NBF_4$.

The nonaqueous electrolytic solution 24 in this embodiment has a property of being unlikely to be oxidized and decomposed even when being supplied with a high charge voltage. Therefore, the electrical double layer capacitor in this embodiment is usable as a device of a high charge voltage exceeding 4.3V (super high voltage-type nonaqueous-system electricity storage device).

FIG. 2 shows a coin-type electrical double layer capacitor, but the electrical double layer capacitor in this embodiment may have other shapes, for example, may be cylindrical or prismatic.

EXAMPLE 1

1. Evaluation on the Dipole Moment and the Highest Occupied Molecular Orbit (HOMO) Energy of the Fluorine-containing Cyclic Saturated Hydrocarbon Represented by General Formula (1)

The dipole moment and the highest occupied molecular orbit energy of the fluorine-containing cyclic saturated hydrocarbon represented by general formula (1) were calculated. For comparison, the dipole moment and the highest occupied molecular orbit energy of methylcyclohexane (MCH) containing no fluorine were also calculated.

The dipole moment is an index representing the magnitude of intramolecular polarization, and is related to the compatibility with a polar solvent expressed by the present invention. The highest occupied molecular orbit energy is an index representing the energy required to pull out one electron from a molecule, and is related to the oxidation resistance performance of the solvent.

The dipole moment and the highest occupied molecular orbit energy were calculated using a quantum-chemical calculation method. Specifically, the calculation was performed using commercially available first principle molecular orbit calculation software, using the density functional method (B3LYP) as the calculation method and 6-31G(d) as the basis function. The optimization of the energy value was performed by self consistent field calculation.

Figure 3:
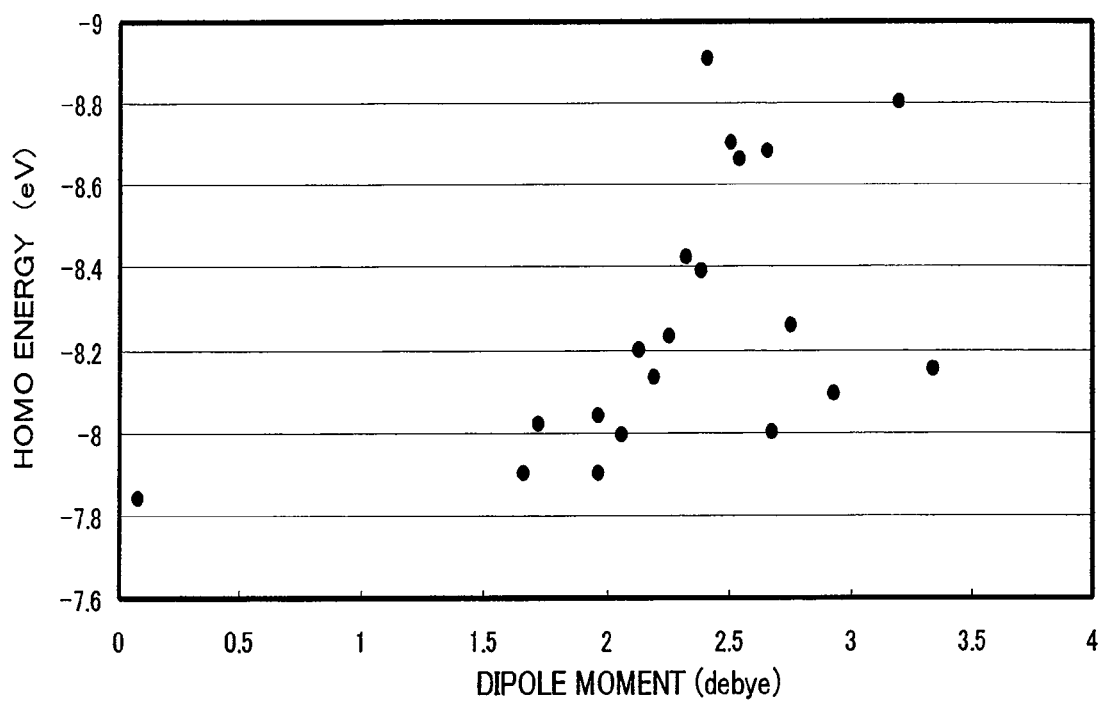
FIG. 3 shows the dipole moment and the highest occupied molecular orbit (HOMO) energy of each type of fluorine-containing cyclic saturated hydrocarbon contained in a nonaqueous solvent for an electricity storage device according to the present invention.

The calculation results are shown in Table 2. FIG. 3 shows the results of plotting the dipole moment and the highest occupied molecular orbit energy of each type of fluorine-containing cyclic saturated hydrocarbon.

Table 2

| | Compound | Formula | * [debye] | ** [eV] |
|---|---|---|---|---|
| Ex. | Fluoromethylcyclohexane | $CH_2F$ | 1.72 | −8.02 |
| Ex. | Difluoromethylcyclohexane | $CHF_2$ | 2.14 | −8.20 |
| Ex. | Trifluoromethylcyclohexane | $CF_3$ | 2.33 | −8.42 |
| Ex. | (1-Fluoroethyl)cyclohexane | $CHFCH_3$ | 1.66 | −7.90 |
| Ex. | (2-Fluoroethyl)cyclohexane | $CH_2CH_2F$ | 1.97 | −7.90 |
| Ex. | (1,1-Difluoroethyl)cyclohexane | $CF_2CH_3$ | 1.97 | −8.04 |

Table 2-continued

| Compound | Formula | *[debye] | **[eV] |
|---|---|---|---|
| Ex. (1,2-Difluoroethyl)cyclohexane | CHFCH₂F-cyclohexyl | 2.68 | −8.00 |
| Ex. (2,2-Difluoroethyl)cyclohexane | CH₂CHF₂-cyclohexyl | 2.07 | −7.99 |
| Ex. (1,1,2-Trifluoroethyl)cyclohexane | CF₂CH₂F-cyclohexyl | 3.34 | −8.15 |
| Ex. (1,2,2-Trifluoroethyl)cyclohexane | CHFCHF₂-cyclohexyl | 2.93 | −8.09 |
| Ex. (2,2,2-Trifluoroethyl)cyclohexane | CH₂CF₃-cyclohexyl | 2.2 | −8.13 |
| Ex. (1,1,2,2-Tetrafluoroethyl)cyclohexane | CF₂CHF₂-cyclohexyl | 2.76 | −8.26 |
| Ex. (1,2,2,2-Tetrafluoroethyl)cyclohexane | CHFCF₃-cyclohexyl | 2.26 | −8.23 |
| Ex. (Pentafluoroethyl)cyclohexane | CF₂CF₃-cyclohexyl | 2.39 | −8.39 |
| Ex. 1,1-bis(trifluoromethyl)cyclohexane | (CF₃)₂-cyclohexyl (1,1) | 2.51 | −8.70 |
| Ex. 1,2-bis(trifluoromethyl)cyclohexane | (CF₃)₂-cyclohexyl (1,2) | 3.2 | −8.80 |
| Ex. 1,3-bis(trifluoromethyl)cyclohexane | (CF₃)₂-cyclohexyl (1,3) | 2.42 | −8.91 |
| Ex. 1-(pentafluoroethyl)-1-(trifluoromethyl)cyclohexane | CF₂CF₃, CF₃-cyclohexyl | 2.55 | −8.66 |
| Ex. 1,1-bis(pentafluoroethyl)cyclohexane | (CF₂CF₃)₂-cyclohexyl | 2.66 | −8.68 |
| *** Methylcyclohexane | CH₃-cyclohexyl | 0.08 | −7.84 |

\* Dipole moment (debye)
\*\* Highest occupied molecular orbit energy (eV)
\*\*\* Comparative Ex.

All the types of the fluorine-containing cyclic saturated hydrocarbon represented by general formula (1) had a dipole moment larger than about 1.6 debye. The fluorine-containing cyclic saturated hydrocarbon having the smallest dipole moment was (1-fluoroethyl)cyclohexane (1FECH), which had a dipole moment of 1.66. By contrast, methylcyclohexane had a dipole moment of 0.08 debye.

All the types of the fluorine-containing cyclic saturated hydrocarbon represented by general formula (1) had a highest occupied molecular orbit energy smaller than that of methylcyclohexane. Oxidation reaction is a reaction of pulling out electrons from a molecule. As the highest occupied molecular orbit energy is smaller (larger in a negative direction), a larger energy is required to pull electrons, which means that the oxidation resistance is higher. Accordingly, it is understood that all the types of fluorine-containing cyclic saturated hydrocarbon according to the present invention obtained by introducing, as a substituent, an alkyl group having a fluorine atom in a cyclohexane cyclic structure have a high oxidation resistance.

2. Evaluation of the Compatibility of the Fluorine-containing Cyclic Saturated Hydrocarbon Represented by General Formula (1) with a Polar Solvent

2.1 Preparation of Samples

It is considered that as the dipole moment of the fluorine-containing cyclic saturated hydrocarbon represented by general formula (1) is larger, the compatibility thereof with a polar solvent is higher. In consideration of this, the compatibility of the following materials among the types of fluorine-containing cyclic saturated hydrocarbon shown in Table 2 with a polar solvent was evaluated: materials having a relatively small dipole moment, i.e., (1-fluoroethyl)cyclohexane (dipole moment: 1.66) and (2-fluoroethyl)cyclohexane (dipole moment: 1.97); a material having a medium dipole moment, i.e., trifluoromethylcyclohexane (dipole moment: 2.33); and a material having a relatively large dipole moment, i.e., 1,2-bis(trifluoromethyl)cyclohexane (dipole moment: 3.2). These types of fluorine-containing cyclic saturated hydrocarbon were prepared as follows.

<Trifluoromethylcyclohexane>

A commercially available product of trifluoromethylcyclohexane (TFMCH) [CAS RN: 401-75-2] was used. The commercially available product was purified by a spinning-band type fractionating distillation apparatus (produced by Oka Kogyo Kabushiki Kaisha). The purity of the obtained purified product, which was measured by gas chromatography (using a gas chromatograph produced by Shimadzu Corporation), was 99.5%.

<1.2-bis(trifluoromethyl)cyclohexane>

1.2-bis(trifluoromethyl)cyclohexane (12BTFMCH) was obtained by a synthesis method described below.

5 g of platinum oxide (produced by Aldrich) and 250 mL of trifluoroacetic acid (produced by Wako Pure Chemical Industries, Ltd.) were put into an oxidation-resistant autoclave having a Teflon inner tube, and the inside thereof was substituted with hydrogen. The resultant substance was stirred for 1 hour at room temperature in a hydrogen atmosphere of 0.2 Mpa. The autoclave was removed, and 25 g of 1,2-ditrifluoromethylbenzene (produced by Tokyo Chemical Industry Co., Ltd.) was added and stirred again for 18 hours at room temperature in a hydrogen atmosphere of 0.8 MPa. After the stirring was finished, it was confirmed by a gas chromatography (GC) analysis that the peak of 1,2-ditrifluoromethylbenzene, which was a starting material, disappeared. After the trifluoroacetic acid solution only was removed from the resultant black precipitate liquid by decantation, the residue was washed with trifluoroacetic acid. 300 mL of distilled water was added to a mixture of the trifluoroacetic acid and the residue, and was separated into two layers by a separating funnel. The lower layer containing the target substance was taken out. 100 mL of dichloromethane was added to the lower layer, and then was washed with sodium bicarbonate water. The layer of dichloromethane solution was taken out by a separating funnel, and dried with anhydrous sodium sulfate. After the anhydrous sodium sulfate was removed by filtration, the resultant substance was distilled by a Liebig condenser at a oven temperature of 60° C. to remove dichloromethane. The residue was purified 4 times by reduced pressure distillation using a rectifying tower including a Liebig condenser having 3-stage inner tubes under the conditions of the oven temperature of 100 to 170° C., the vapor temperature of 90 to 145° C. and the internal pressure of 280 to 420 mmHg. As a result, 11.8 g of colorless liquid was obtained.

By the measurement of $^1$H-NMR spectrum (CDCl$_3$), a multiplet corresponding to two hydrogen atoms having a peak at 1.437, 1.459, 1.470, 1.481, 1.494, 1.515, and 1.541 ppm, a multiplet corresponding to four hydrogen atoms having a peak at 1.630, 1.641, 1.652, 1.685, 1.726, 1.742, 1.754, and 1.778 ppm, a multiplet corresponding to two hydrogen atoms having a peak at 1.977, 1.996, 2.013, 2.024, and 2.044 ppm, and a multiplet corresponding to two hydrogen atoms having a peak at 2.493, 2.518, 2.528, 2.539, 2.543, 2.553, 2.564 and 2.589 ppm were observed. Thus, it was found that the number of the hydrogen atoms of this compound was 10. By the measurement of $^{19}$F-NMR spectrum (CDCl$_3$), a singlet corresponding to six fluorine atoms having a peak at −66.191 ppm was observed. From the above-described results, it was found that the colorless liquid was 1,2-bis(trifluoromethyl)cyclohexane.

The purity, which was measured by gas chromatography (using a gas chromatograph produced by Shimadzu Corporation), was 99.0%.

<(1-fluoroethyl)cyclohexane>

(1-fluoroethyl)cyclohexane (1FECH) was obtained by a synthesis method described below.

50 g of DAST ((diethylamino)sulfur trifluoride)) (produced by Tokyo Chemical Industry Co., Ltd.) was put into a 1 L reactor accommodating 360 mL of anhydrous dichloromethane (produced by Kanto Chemical Co., Inc.) and cooled to −10° C. Into the resultant solution, a mixture solution obtained by diluting 36.1 g of 1-cyclohexylethanol (produced by Alfa Aesar) with 140 mL of anhydrous dichloromethane (produced by Kanto Chemical Co., Inc.) was slowly dropped such that the temperature of the reactor would not become equal to, or higher than, 0° C. Then, the resultant substance was stirred at −10° C. for 1 hour. 300 mL of distilled water was added to this solution while the temperature was kept at −10° C., and stirred for 30 minutes. Then, the resultant substance was kept still and separated into two layers. The organic layer was taken out by a separating funnel. This organic layer was washed with 400 mL of 1N hydrochloric acid. The resultant substance was kept still and separated into two layers. The organic layer was taken out by a separating funnel. 300 mL of 28% by weight of ammonia water was added to this organic layer and stirred. The resultant substance was kept still and separated into two layers. The organic layer was taken out by a separating funnel. This organic layer was washed with 400 mL of distilled water. The resultant substance was kept still and separated into two layers. The organic layer was taken out by a separating funnel. Anhydrous magnesium sulfate was added to the obtained organic solution and dried. After the anhydrous magnesium sulfate was removed by filtration, the resultant substance was distilled by a Liebig condenser at a oven temperature of 50° C. to remove dichloromethane. As a result, 38.1 g of slightly yellowish colorless liquid was obtained.

By the measurement of $^1$H-NMR spectrum (CDCl$_3$), equivalent multiplets of 4.303 to 4.334 ppm and 4.423 to 4.455 ppm corresponding to one hydrogen atom generated by division as a result of interaction with a nuclear spin of a fluorine atom were observed. Thus, it was found that the number of hydrogen on carbon to which the fluorine atom was bonded was 1. By the measurement of $^{19}$F-NMR spectrum (CDCl$_3$), a singlet corresponding to one fluorine atom having a peak at −202.547 ppm was observed. From the above-described results, it was found that the slightly yellowish colorless liquid was (1-fluoroethyl)cyclohexane.

The purity, which was measured by gas chromatography (using a gas chromatograph produced by Shimadzu Corporation), was 60.1%.

<(2-fluoroethyl)cyclohexane>

(2-fluoroethyl)cyclohexane (2FECH) was obtained by a synthesis method described below.

100 g of 2-cyclohexylethanol (produced by Tokyo Chemical Industry Co., Ltd.), 162 mL of triethylamine (produced by Tokyo Chemical Industry Co., Ltd.), and 1 L of dehydrated dichloromethane (produced by Kanto Chemical Co., Inc.) were put into a 2 L reactor and ice-cooled to 5° C. To the resultant mixture solution, 72.4 mL of methanesulfonylchloride (produced by Tokyo Chemical Industry Co., Ltd.) was slowly added and stirred at 5° C. for 1 hour. Then, it was confirmed by thin layer chromatography (TLC) that the spot of the starting material disappeared and a new spot was generated. After 50 mL of distilled water was added to this solution, the resultant substance was kept still and separated into two layers. The organic layer and the water layer were taken out by a separating funnel. 30 mL of dichloromethane (produced by Kanto Chemical Co., Inc.) was added to the water layer. The resultant substance was kept still and separated into two layers. The dichloromethane layer was taken out by a separating funnel. The dichloromethane layer was mixed with the organic layer taken out above, and the resultant mixture was washed with 300 mL of distilled water. Then, the organic layer was taken out by a separating funnel. The organic layer was further washed with 300 mL of saturated saline solution. Then, the organic layer was taken out by a separating funnel. To the obtained organic solution, anhydrous magnesium sulfate was added and dried. Then, anhydrous magnesium sulfate was removed by filtration, and the resultant substance was concentrated. As a result, 165 g of pale orange liquid was obtained. This liquid was dried in a high vacuum state. As a result, 157 g of 2-cyclohexylethyl methanesulfonate, which is a mesylated form of 2-cyclohexylethanol, was obtained. 2-cyclohexylethanol was the pale orange liquid.

120 g of the obtained 2-cyclohexylethyl methanesulfonate was put into a 1 L reactor. 367 g of tetrabutylammonium fluoride (produced by Wako Pure Chemical Industries, Ltd.) and 180 g of acetonitrile (produced by Wako Pure Chemical Industries, Ltd.) were added thereto, and stirred in an environment of 50° C. for 24 hours. A part of the resultant solution was taken out and analyzed by gas chromatography (using a gas chromatograph produced by Shimadzu Corporation). It was confirmed that the peak of 2-cyclohexylethyl methanesulfonate, which was a starting material, completely disappeared. 1 L of distilled water was added to this solution, and the organic layer was extracted with 300 mL of pentane (produced by Kanto Chemical Co., Inc.) 3 times. The obtained organic layer was washed with 800 mL of distilled water. The organic layer was taken out by a separating funnel. After being washed with the above-mentioned distilled water, the organic layer was washed with 800 mL of saturated saline solution. The organic layer was taken out by a separating funnel. To the obtained organic solution, anhydrous magnesium sulfate was added and dried. The anhydrous magnesium sulfate was removed by filtration. The organic solution deprived of the anhydrous magnesium sulfate was subjected to reduced pressure distillation in an environment of 30° C. to remove the pentane as the solvent. The residue was purified by reduced pressure distillation using a rectifying tower including a Liebig condenser having 3-stage inner tubes under the conditions of the oven temperature of 72° C., the vapor temperature of 62° C. and the internal pressure of 32 mmHg. As a result, 39.5 g of colorless liquid was obtained.

By the measurement of $^1$H-NMR spectrum (CDCl$_3$), a multiplet corresponding to two hydrogen atoms having a peak at 0.886, 0.897, 0.921, 0.948, 0.979, and 0.987 ppm, a multiplet corresponding to three hydrogen atoms having a peak at 1.130, 1.138, 1.145, 1.162, 1.168, 1.176, 1.191, 1.197, 1.204, 1.211, 1.234, 1.242, 1.259, 1.265, and 1.297 ppm, a multiplet corresponding to one hydrogen atom having a peak at 1.414, 1.424, 1.433, 1.441, 1.451, 1.459, and 1.467 ppm, a multiplet corresponding to seven hydrogen atoms having a peak at 1.531, 1.547, 1.551, 1.562, 1.579, 1.595, 1.611, 1.627, 1.639, 1.643, 1.655, 1.661, 1.680, 1.686, 1.695, 1.701, 1.716, 1.720, 1.745, 1.749, and 1.753, and two peaks corresponding to two hydrogen atoms formed of triplet peaks at 4.415, 4.430, and 4.446 ppm and triplet peaks at 4.534, 4.549, and 4.565 ppm were observed. Thus, it was found that the number of the hydrogen atoms of this compound was 15. From the triplet peaks at 4.415, 4.430, and 4.446 ppm and the triplet peaks at 4.534, 4.549, and 4.565 ppm, it was found that the number of hydrogen atoms on carbon to which the fluorine atom was bonded was 2, and that the number of hydrogen atoms, on carbon, which are bonded to carbon bonded to the fluorine atom was 2. By the measurement of $^{19}$F-NMR spectrum (CDCl$_3$), a singlet corresponding to one fluorine atom having a peak at −218.470 ppm was observed. From the above-described results, it was found that the colorless liquid was (2-fluoroethyl)cyclohexane.

The purity, which was measured by gas chromatography (using a gas chromatograph produced by Shimadzu Corporation), was 99.2%.

2.2 Evaluation of the Compatibility

The above-described four types of fluorine-containing cyclic saturated hydrocarbon were each mixed with a compound generally used as a solvent, and the compatibility thereof was evaluated.

<Compatibility of Trifluoromethylcyclohexane>

Purified trifluoromethylcyclohexane (TFMCH) was mixed with propylene carbonate (PC) (commercially available battery grade) at ratios of 5:95, 10:90, 30:70, 50:50, 70:30 and 90:10, and the state of the mixtures was observed. The results are shown in Table 3. In Table 3 and also Tables 4 through 7 mentioned below, "○" indicates that the material was completely compatible and became transparent and "X" indicates that layer separation occurred or the material was not compatible and became cloudy.

TABLE 3

| | Mixing ratio | | | | | |
|---|---|---|---|---|---|---|
| TFMCH | 5 | 10 | 30 | 50 | 70 | 90 |
| PC | 95 | 90 | 70 | 50 | 30 | 10 |
| Compatibility | ○ | ○ | ○ | ○ | ○ | ○ |

From the results shown in Table 3, it is understood that trifluoromethylcyclohexane and propylene carbonate were completely compatible at all the mixing ratios.

<Compatibility of 1,2-bis(trifluoromethyl)cyclohexane>

Similarly, mixtures of 1,2-bis(trifluoromethyl)cyclohexane (12BTFMCH) and propylene carbonate (PC) were generated and the state of the mixtures was observed. The results are shown in Table 4.

TABLE 4

| | Mixing ratio | | | | | |
|---|---|---|---|---|---|---|
| 12BTF MCH | 5 | 10 | 30 | 50 | 70 | 90 |
| PC | 95 | 90 | 70 | 50 | 30 | 10 |
| Compatibility | ○ | ○ | ○ | ○ | ○ | ○ |

From the results shown in Table 4, it is understood that 1,2-bis(trifluoromethyl)cyclohexane and propylene carbonate were completely compatible at all the mixing ratios.

<Compatibility of (1-fluoroethyl)cyclohexane>

Similarly, mixtures of (1-fluoroethyl)cyclohexane (1FECH) and propylene carbonate (PC) were generated and the state of the mixtures was observed. The results are shown in Table 5.

TABLE 5

| | Mixing ratio | | | | | |
|---|---|---|---|---|---|---|
| 1FECH | 5 | 10 | 30 | 50 | 70 | 90 |
| PC | 95 | 90 | 70 | 50 | 30 | 10 |
| Compatibility | ○ | ○ | ○ | X | ○ | ○ |

From the results shown in Table 5, it is understood that (1-fluoroethyl)cyclohexane and propylene carbonate were completely compatible except for the case where the mixing ratio was 50:50.

<Compatibility of (2-fluoroethyl)cyclohexane>

Similarly, mixtures of (2-fluoroethyl)cyclohexane (2FECH) and propylene carbonate (PC) were generated and the state of the mixtures was observed. The results are shown in Table 6.

TABLE 6

| | Mixing ratio | | | | | |
|---|---|---|---|---|---|---|
| 2FECH | 5 | 10 | 30 | 50 | 70 | 90 |
| PC | 95 | 90 | 70 | 50 | 30 | 10 |
| Compatibility | ○ | ○ | ○ | ○ | ○ | ○ |

From the results shown in Table 6, it is understood that (2-fluoroethyl)cyclohexane and propylene carbonate were completely compatible at all the mixing ratios.

In a comparative example, the compatibility of methylcyclohexane (MCH) containing no fluorine atom and propylene carbonate was evaluated. The results are shown in Table 7. A commercially available product of methylcyclohexane (produced by Kanto Chemical Co., Inc.) was used after being purified by a spinning-band type fractionating distillation apparatus (produced by Oka Kogyo Kabushiki Kaisha). The purity, which was measured by gas chromatography (using a gas chromatograph produced by Shimadzu Corporation), was 99.5%.

TABLE 7

| | Mixing ratio | | | | | |
|---|---|---|---|---|---|---|
| MCH | 5 | 10 | 30 | 50 | 70 | 90 |
| PC | 95 | 90 | 70 | 50 | 30 | 10 |
| Compatibility | X | X | X | X | X | X |

From the results shown in Table 7, it is understood that methylcyclohexane and propylene carbonate were not compatible at any mixing ratio.

The above-described results can be summarized as follows: it was found that the four types of fluorine-containing cyclic saturated hydrocarbon are compatible with propylene carbonate at any ratio except for the case where (1-fluoroethyl)cyclohexane and propylene carbonate are mixed at a ratio of 50:50; and it was also found that methylcyclohexane is not compatible with propylene carbonate at all.

(1-fluoroethyl)cyclohexane has the smallest dipole moment among the types of fluorine-containing cyclic saturated hydrocarbon represented by general formula (1) shown in Table 2. As described above, the compatibility is considered to rely on the dipole moment of the molecule. Therefore, it can be presumed that the other types of fluorine-containing cyclic saturated hydrocarbon shown in Table 2, on which the compatibility was not evaluated, are also compatible with at least propylene carbonate at any ratio.

EXAMPLE 2

1. Evaluation of the Oxidation Resistance of the Solvent for an Electricity Storage Device I A nonaqueous electrolytic solution was prepared using a solvent for an electricity storage device according to the present invention, and the value of the current flowing when a voltage was applied to the nonaqueous electrolytic solution was measured. Thus, the oxidation resistance of the solvent or an electricity storage device was evaluated.

Figure 4:
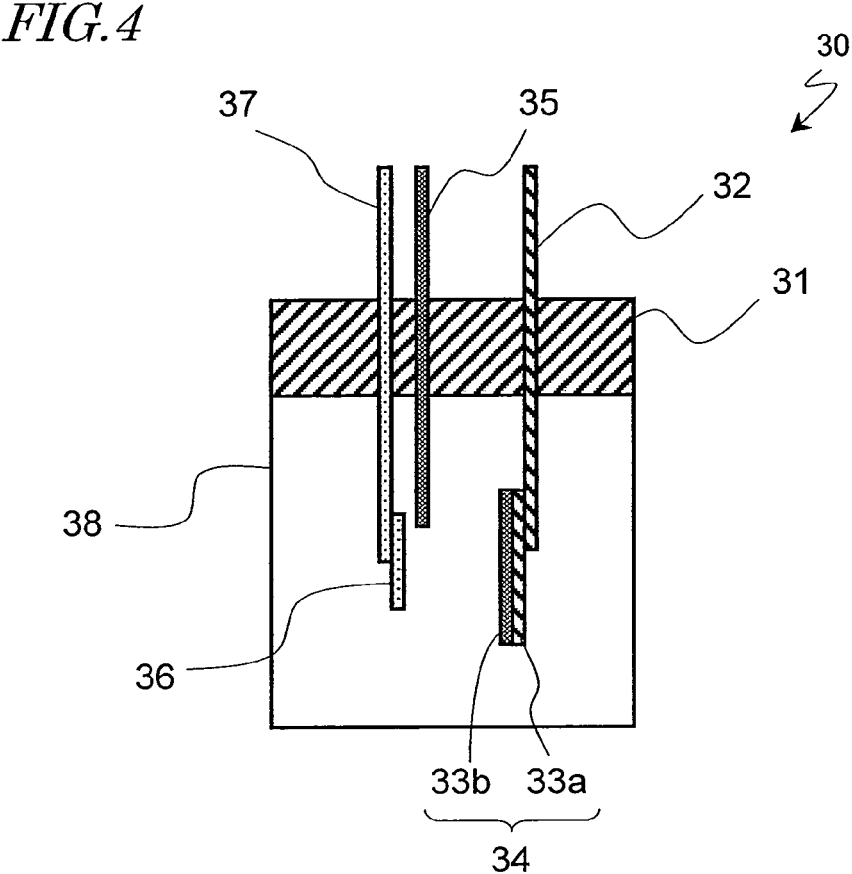
FIG. 4 is a cross-sectional view showing a three-electrode glass battery used for evaluating the oxidation resistance.

First, a 3-electrode glass battery 30 shown in FIG. 4 was prepared. The 3-electrode glass battery 30 has a structure in which a glass container 38 accommodates a working electrode 36 and a counter electrode 34 facing the working electrode 36, and a reference electrode 35. As the working electrode 36, a 1 cm×1 cm Pt plate (purity: 99.9% by weight) was used. As the counter electrode 34, a 2 cm×2 cm stainless steel (SUS304) mesh 33a provided with a 150 μm-thick Li foil 33b pressure-contacted thereon was used. As the reference electrode 35, an Li wire having a diameter of 2 mm was used. The working electrode 36 is connected to a Pt wire 37, and the counter electrode 34 is connected to a stainless steel wire 32. The Pt wire 37, the reference electrode 35 and the stainless steel wire 32 are fixed by a rubber stopper 31.

Next, samples in Example 2-1 and Comparative Examples 2-1 and 2-2 were prepared for evaluation of the oxidation resistance.

EXAMPLE 2-1

In purified TFMCH, $LiPF_6$ (commercially available battery grade) was dissolved as a supporting salt to prepare a TFMCH electrolytic solution. In the TFMCH nonaqueous electrolytic solution, the concentration of $LiPF_6$ was set to 0.1 mol/L.

COMPARATIVE EXAMPLE 2-1

PC (commercially available battery grade) was used as a solvent. In PC, $LiPF_6$ (commercially available battery grade) was dissolved as a supporting salt to prepare a PC electrolytic solution. Like in Example 1, the concentration of $LiPF_6$ in the PC electrolytic solution was set to 0.1 mol/L.

COMPARATIVE EXAMPLE 2-2

Ethylmethyl carbonate (EMC) (commercially available battery grade) was used as a solvent. In EMC, $LiPF_6$ (commercially available battery grade) was dissolved as a supporting salt to prepare an EMC electrolytic solution. Like in Example 1, the concentration of $LiPF_6$ in the EMC electrolytic solution was set to 0.1 mol/L.

In the above-described 3-electrode glass battery 30, the sample in each of Example 2-1, Comparative Example 2-1 and Comparative Example 2-2 was injected to provide an evaluation battery. The voltage-current curve was obtained by the linear sweep voltammetry (LSV) method using an electrochemical analyzer (produced by ALS) providing a maximum inter-electrode voltage of 26 V. The measurement was conducted by sweeping the voltage of the working electrode 36 with respect to the reference electrode 35 from the natural open circuit voltage to 8 V at a rate of 5 mV/sec. When the voltage between the working electrode 36 and the reference electrode 35 was 8 V, the voltage between the working electrode 36 and the counter electrode 34 was 25 V. The results are shown in FIG. 5.

Figure 5:
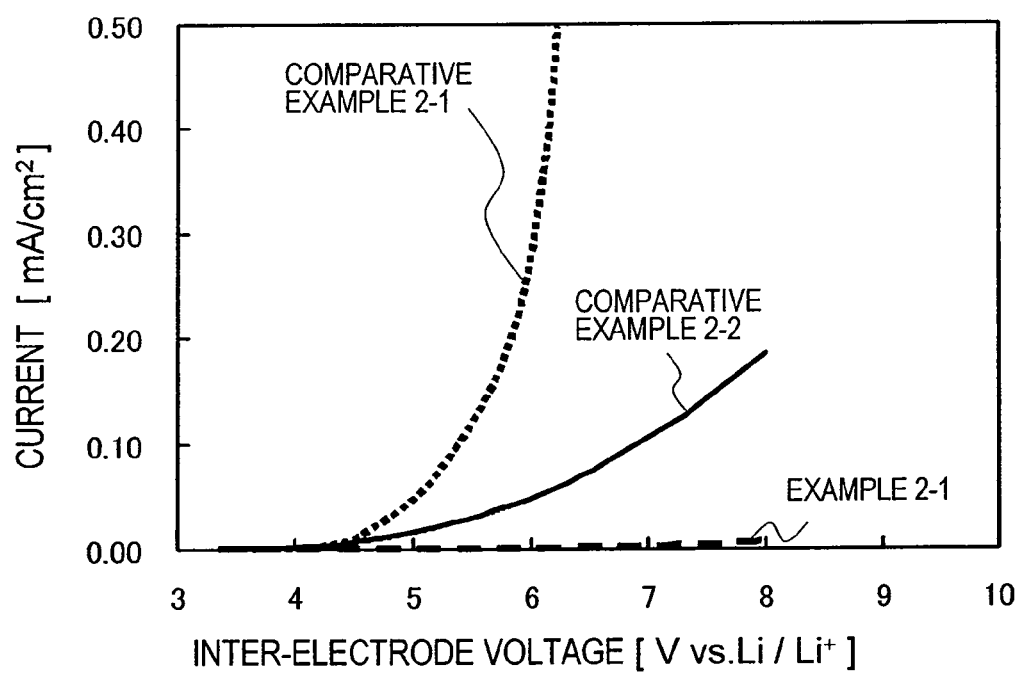
FIG. 5 is a graph showing the voltage-current curves which represent the oxidation resistances of Example 2.

As shown in FIG. 5, in the Example 2-1 sample, the current value does not increase even when the inter-electrode voltage increases. By contrast, in Comparative Examples 2-1 and 2-2, the current value increases from when the inter-electrode voltage exceeds about 4 V. From this, it is understood that TFMCH in Example 2-1 is not oxidized even when the inter-electrode voltage increases, whereas PC in Comparative Example 2-1 and EMC in Comparative Example 2 are progressively oxidized as the inter-electrode voltage increases. A conceivable reason why TFMCH is less likely to be oxidized than PC and EMC is that fluorine in TFMCH has a higher electronegativity than oxygen in PC and EMC. As described above, it is made clear that TFMCH has a higher oxidation resistance than cyclic carbonates represented by PC and chain carbonates represented by EMC.

2. Evaluation of the Oxidation Resistance of the Solvent for an Electricity Storage Device II Substantially the same experiment as that in evaluation I was performed using TFMCH, 12BTFMCH and 2FECH by a different evaluation method.

EXAMPLE 2-2

In a mixture solvent of TFMCH purified in Example 1 and diethyl carbonate (DEC) (commercially available battery grade) mixed at a volumetric ratio of 10:90, $LiPF_6$ (commercially available battery grade) was dissolved as a supporting electrolyte salt to prepare an electrolytic solution in Example 2-2. In the electrolytic solution, the concentration of $LiPF_6$ was set to 0.1 mol/L.

EXAMPLE 2-3

In a mixture solvent of 12BTFMCH synthesized in Example 1 and diethyl carbonate (DEC) (commercially available battery grade) mixed at a volumetric ratio of 10:90, $LiPF_6$ (commercially available battery grade) was dissolved as a supporting electrolyte salt to prepare an electrolytic solution in Example 2-3. In the electrolytic solution, the concentration of $LiPF_6$ was set to 0.1 mol/L.

EXAMPLE 2-4

In a mixture solvent of 2FECH synthesized in Example 1 and diethyl carbonate (DEC) (commercially available battery grade) mixed at a volumetric ratio of 10:90, $LiPF_6$ (commercially available battery grade) was dissolved as a supporting electrolyte salt to prepare an electrolytic solution in Example 2-4. In the electrolytic solution, the concentration of $LiPF_6$ was set to 0.1 mol/L.

COMPARATIVE EXAMPLE 2-3

In a mixture solvent of PC (commercially available battery grade) and diethyl carbonate (DEC) (commercially available battery grade) mixed at a volumetric ratio of 10:90, $LiPF_6$ (commercially available battery grade) was dissolved as a supporting electrolyte salt to prepare an electrolytic solution in Comparative Example 2-3. In the electrolytic solution, the concentration of $LiPF_6$ was set to 0.1 mol/L.

COMPARATIVE EXAMPLE 2-4

In a mixture solvent of ethylmethyl carbonate (EMC) (commercially available battery grade) and diethyl carbonate (DEC) (commercially available battery grade) mixed at a volumetric ratio of 10:90, $LiPF_6$ (commercially available battery grade) was dissolved as a supporting electrolyte salt to prepare an electrolytic solution in Comparative Example 2-4. In the electrolytic solution, the concentration of $LiPF_6$ was set to 0.1 mol/L.

Like in evaluation I, as shown in FIG. 4, in the 3-electrode glass battery 30, each of the electrolytic solutions in Examples 2-2 through 2-4 and Comparative Examples 2-3 and 2-4 was injected to provide an evaluation battery. The voltage-current curve was obtained by the linear sweep voltammetry (LSV) method using an electrochemical analyzer (produced by ALS) providing a maximum inter-electrode voltage of 26 V. The measurement was conducted by sweeping the voltage of the working electrode with respect to the reference electrode from the natural open circuit voltage to 8 V at a rate of 5 mV/sec. Separately, a blank electrolytic solution was prepared by dissolving 0.1 mol/L of $LiPF_6$ (commercially available battery grade) as a supporting electrolyte salt in a single DEC (commercially available battery grade) solvent. The voltage-current curve was obtained by the LSV method. The obtained voltage-current curve was subtracted from the voltage-current curve of each of Examples 2-2 through 2-4 and Comparative Examples 2-3 and 2-4 to provide a voltage-current curve representing an oxidation behavior of each of TFMCH, 12BTFMCH, 2FECH, PC and EMC. The measurement results are shown in FIG. 6.

Figure 6:
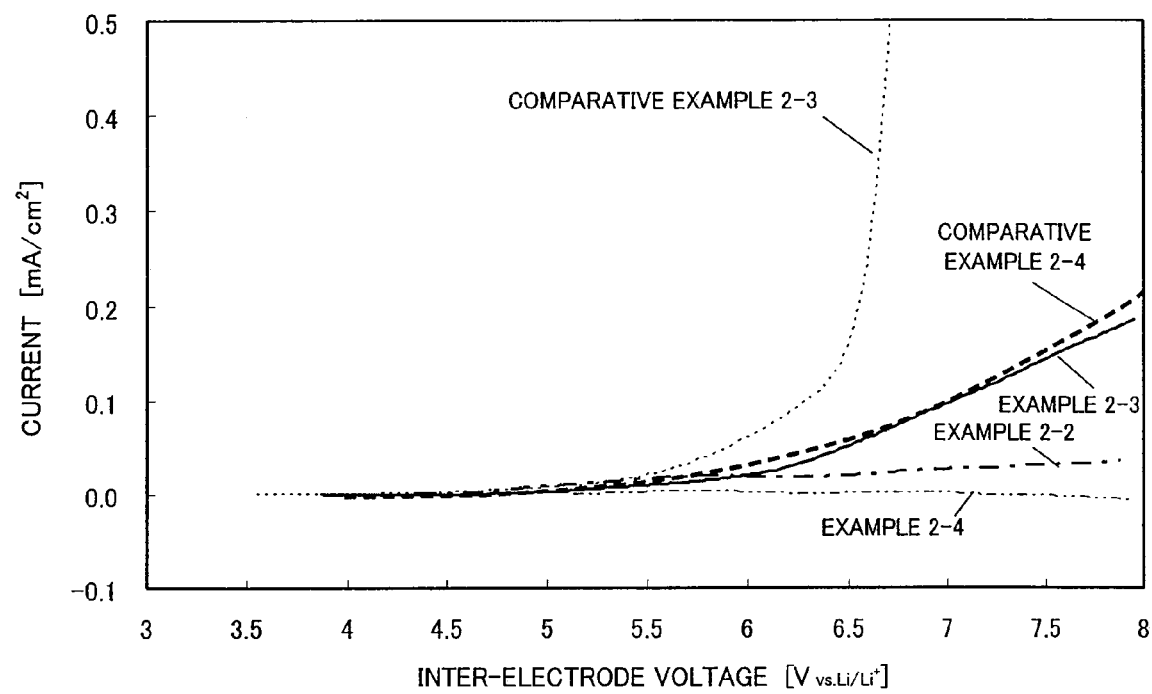
FIG. 6 is a graph showing the voltage-current curves which represent the oxidation resistances of Example 2.

As shown in FIG. 6, the current value of the electrolytic solution in Examples 2-2 through 2-4 is kept small even when the voltage between the working electrode and the reference electrode increases, as compared with the increase behavior of the current value of the electrolytic solution in Comparative Examples 2-3 and 2-4. The current value measured by the LSV method is an index representing the rate of oxidation reaction of the solvent. A small current value means that the oxidation resistance of the solvent is superb. Especially the solvents according to the present invention used in the examples all have a small current value when the voltage between the working electrode and the reference electrode is around 6V, which is important in a lithium ion secondary battery of a charge voltage of 4 to 5V or in an electrical double layer capacitor to be charged to 2.5V or higher. It is understood that the solvents according to the present invention are superb as a solvent for a high voltage electricity storage device.

3. Evaluation of the Gas Generation Capability

Figure 7:
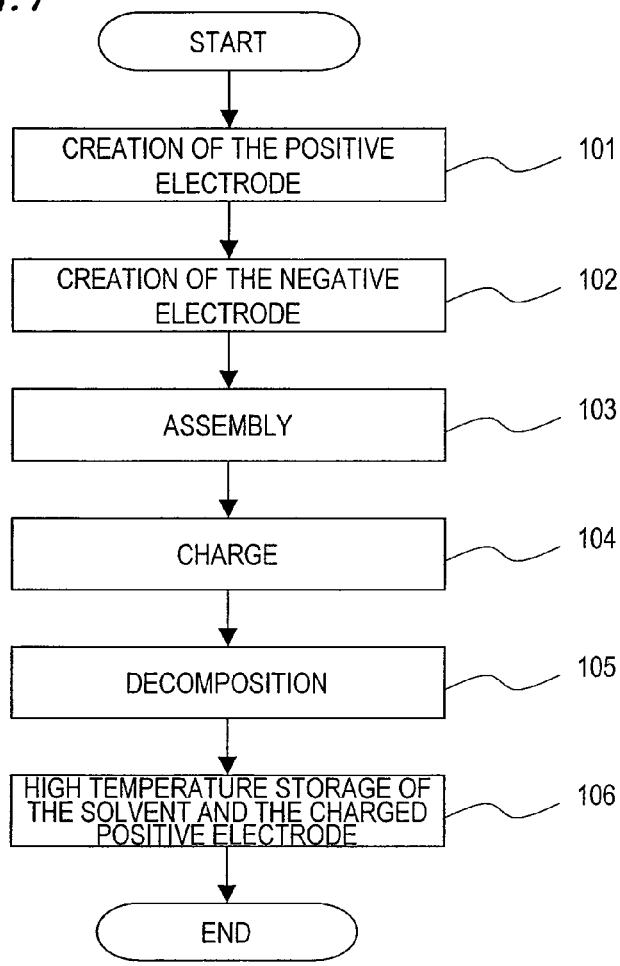
FIG. 7 is a flowchart showing the procedure of the experiments of Examples 3 and 4.

A solvent for an electricity storage device according to the present invention and a positive electrode charged at a high voltage were sealed together and maintained at a high temperature. The gas generation amount in this case was measured. This experiment was performed in accordance with the flowchart shown in FIG. 7. The structure of the lithium ion secondary battery created in steps 101 through 103 in the flowchart in FIG. 7 is as shown in FIG. 1A through FIG. 1C.

Hereinafter, each step of the flowchart shown in FIG. 7 will be described in detail.

<Creation of the Positive Electrode (step 101)>

First, as the positive electrode active material, $LiCoO_2$ (average particle diameter: 10 µm; specific surface area by the BET method: 0.38 $m^2$/g) was prepared. To 100 parts by weight of the active material, 3 parts by weight of acetylene black as a conductor, 4 parts by weight of poly(vinylidene fluoride) as a binder, and an appropriate amount of N-methyl-2-pyrrolidone were added, stirred and mixed to obtain a slurry-like positive electrode mixer. The poly(vinylidene fluoride) was used in the state of being dissolved in N-methyl-2-pyrrolidone.

Next, as shown in FIG. 1C, the slurry-like positive electrode mixer 1b was applied on the surface of the current collector 1a formed of an aluminum foil having a thickness of 20 µm. The applied layer was dried and pressed by a roller.

$LiCoO_2$ used as the positive electrode active material was prepared as follows. While a saturated aqueous solution of cobalt sulfate was stirred at a low rate, an alkaline solution having sodium hydroxide dissolved therein was dropped thereto to obtain a precipitate of Co(OH)$_2$. This precipitate was filtrated, washed with water, and heated to 80° C. in the air to be dried. The average particle diameter of the obtained hydroxide was about 10 μm.

Next, the obtained hydroxide was heat-treated at 380° C. for 10 hours in the air to obtain Co$_3$O$_4$, which is an oxide. It was confirmed by powder X ray diffraction analysis that the obtained oxide had a single phase.

In addition, the obtained oxide was mixed with powder of lithium carbonate such that the ratio of the Co molarity and the Li molarity would be 1.00:1.00. The resultant substance was heat-treated at 850° C. for 10 hours in the dried air. Thus, the target LiCoO$_2$ was obtained. It was confirmed by a powder X ray diffraction analyzer (produced by Rigaku) that the obtained LiCoO$_2$ had a single-phase hexagonal layer structure. After pulverization and classification, the obtained LiCoO$_2$ was observed with a scanning electron microscope (produced by Hitachi High-Technologies Corporation) to confirm that the particle diameter was about 6 to 15 μm. The average particle diameter was obtained by a scattering-type particle size distribution analyzer (produced by HORIBA).

Figure 8A:
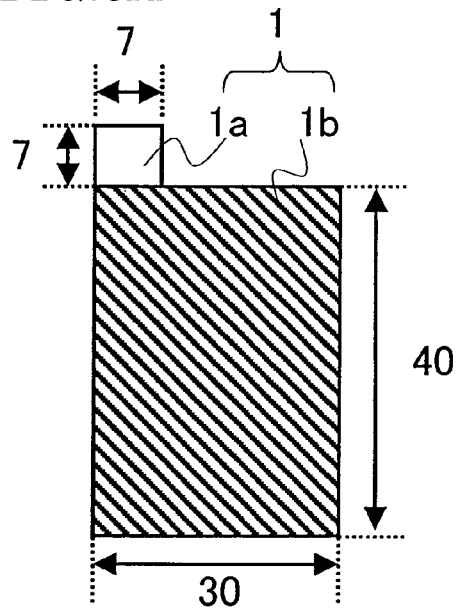
FIG. 8A and FIG. 8B respectively show the size of a positive electrode and a negative electrode in Examples 3 and 4.

The obtained electrode plate was punched out into the size shown in FIG. 8A, and the positive electrode mixer 1b was removed from a tab, which was a lead attaching section. Thus, the positive electrode 1 was obtained. The positive electrode current collector 1a coated with the positive electrode mixer 1b has a rectangular shape of 30 mm×40 mm.

<Fabrication of the Negative Electrode (Step 102)>

Figure 8B:
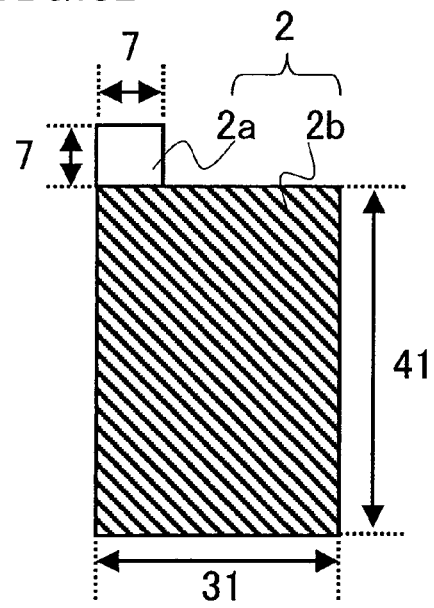

A stainless steel (SUS304) mesh was punched out into the size shown in FIG. 8B to form a negative electrode current collector 2a. The negative electrode current collector 2a includes an electrode section having a rectangular shape of 31 mm×41 mm and a lead attaching section having a square shape of 7 mm×7 mm. On the electrode section of the negative electrode current collector 2a, a metal lithium layer 2b having a thickness of 150 μm was pressure-contacted. Thus, the negative electrode 2 was obtained.

<Assembly (Step 103)>

The obtained positive electrode 1 and negative electrode 2 were stacked with the separator 3 interposed therebetween to create the electrode unit 13 as shown in FIG. 1C. As the separator, a polystyrene microporous sheet having a thickness of 20 μm was used.

Next, as shown in FIG. 1A, the positive electrode lead 11 formed of aluminum was welded to the positive electrode 1 of the electrode unit 13, and the negative electrode lead 12 formed of nickel was welded to the negative electrode 2. Then, the electrode unit 13 was put into the battery case 14 opened on three sides and formed of an aluminum laminate film having a thickness of 0.12 mm. The electrode unit 13 was fixed to the inside of the battery case 14 with a tape formed of PP. Openings including an opening through which the positive electrode lead 11 and the negative electrode lead 12 extended outside were thermally welded, and one opening was left opened without being welded. Thus, the battery case 14 was formed like a bag. As shown in FIG. 1B, a prescribed amount of electrolytic solution 15 was injected through the opening not thermally welded. After the battery case 14 was treated with pressure reduction and deaeration, the opening was thermally welded in a reduced pressure state to seal the inside of the battery.

As the electrolytic solution 15, a material obtained by dissolving LiPF$_6$ (commercially available battery grade) as a supporting electrolyte salt in a mixture solvent of ethylene carbonate (commercially available battery grade) (EC) and EMC (commercially available battery grade) mixed at a volumetric ratio of 1:3 was used. The LiPF$_6$ was dissolved such that the molarity thereof in the electrolytic solution would be 1 mol/L.

<Charge (Step 104)>

The battery created in steps 101 through 103 was treated with constant current charge at a current value of 41mA until the voltage became 4.4V. Then, the constant voltage charge state of 4.4V was maintained until the current value was attenuated to 0.8 mA.

<Deassembly (Step 105)>

After the charge was completed, the battery was unsealed in an inert gas atmosphere having a dew point of −70° C., and the positive electrode 1 welded to the positive electrode lead 11 was taken out. Next, the tab of the positive electrode 1 was cut to remove the positive electrode lead 11. Then, the positive electrode 1 deprived of the tab was immersed in dimethyl carbonate (DMC) (commercially available battery grade) to extract and remove the electrolytic solution contained in the positive electrode 1. Then, the positive electrode 1 was taken out from the DMC and dried at room temperature in vacuum to remove the DMC. Thus, the positive electrode charged to a high voltage was obtained.

<Storage of the Solvent and the Charged Positive Electrode at a High Temperature (Step 106)>

In order to evaluate the gas generation ability of the solvent stored at a high temperature in the presence of the charged positive electrode, nine samples in Examples 2-5 through 2-11 and Comparative Examples 2-5 and 2-6 were created in the respective method described below.

EXAMPLE 2-5

The above-described charged positive electrode was put into a bag-like aluminum laminate film having a width of 50 mm and a height of 100 mm and having one open side. As the solvent to be evaluated, 3 mL of purified TFMCH was injected. The opening was thermally welded in a reduced pressure state to seal the aluminum laminate film.

EXAMPLE 2-6

As the solvent to be evaluated, a mixture of purified TFMCH and PC (commercially available battery grade) mixed at a weight ratio of 90:10 was used. Except for this, the structure was the same as that in Example 2-5.

EXAMPLE 2-7

As the solvent to be evaluated, a mixture of purified TFMCH and PC (commercially available battery grade) mixed at a weight ratio of 50:50 was used. Except for this, the structure was the same as that in Example 2-5.

EXAMPLE 2-8

As the solvent to be evaluated, a mixture of purified TFMCH and PC (commercially available battery grade) mixed at a weight ratio of 10:90 was used. Except for this, the structure was the same as that in Example 2-5.

EXAMPLE 2-9

As the solvent to be evaluated, a mixture of purified TFMCH and PC (commercially available battery grade)

mixed at a weight ratio of 5:95 was used. Except for this, the structure was the same as that in Example 2-5.

EXAMPLE 2-10

As the solvent to be evaluated, synthesized 12BTFMCH was used. Except for this, the structure was the same as that in Example 2-5.

EXAMPLE 2-11

As the solvent to be evaluated, synthesized 2FECH was used. Except for this, the structure was the same as that in Example 2-5.

COMPARATIVE EXAMPLE 2-5

As the solvent to be evaluated, PC (commercially available battery grade) was used. Except for this, the structure was the same as that in Example 2-5.

COMPARATIVE EXAMPLE 2-6

As the solvent to be evaluated, EMC (commercially available battery grade) was used. Except for this, the structure was the same as that in Example 2-5.

The nine samples in Examples 2-5 through 2-11 and Comparative Examples 2-5 and 2-6, i.e., the sealed aluminum laminate films were put into a constant temperature oven and maintained at 85° C. for 3 days. Then, the samples were taken out from the oven, and the quantity analysis of gas generation was conducted by gas chromatography (using a gas chromatograph produced by Shimadzu Corporation). Table 8 shows the total gas generation amount calculated from the results.

TABLE 8

| | Storage voltage (V) | Type of solvent | Mixing ratio | Total gas generation amount ($cm^3$) |
|---|---|---|---|---|
| Example 2-5 | 4.4 | TFMCH | 100 | 0.05 |
| Example 2-6 | | TFMCH:PC | 90:10 | 0.16 |
| Example 2-7 | | TFMCH:PC | 50:50 | 0.68 |
| Example 2-8 | | TFMCH:PC | 10:90 | 1.09 |
| Example 2-9 | | TFMCH:PC | 5:95 | 1.20 |
| Example 2-10 | | 12BTFMCH | 100 | 0.02 |
| Example 2-11 | | 2FECH | 100 | 0.03 |
| Comparative Example 2-5 | | PC | 100 | 1.22 |
| Comparative Example 2-6 | | EMC | 100 | 1.37 |

As shown in Table 8, the gas generation amount is smaller in Examples 2-5 through 2-11 than in Comparative Examples 2-5 and 2-6. A conceivable reason for this is that TFMCH, 12BTFMCH and 2FECH used in Examples 2-5, 2-10 and 2-11 are less likely to be oxidized than PC or EMC used in Comparative Example 2-5 or 2-6. In Examples 2-5, 2-10 and 2-11, almost no gas is generated. A conceivable reason why a tiny amount of gas of 0.02 to 0.05 $cm^3$ is generated is that the electrolytic solution (containing carbonate) used for creating the charged positive electrode remained and was decomposed.

From these results, it is made clear that the effect of the present invention is provided in the case where only TFMCH is used as the solvent as in Example 2-5, in the case where a mixture solvent of TFMCH and PC is used as the solvent as in Examples 2-6 through 2-9, and in the case where 12BTFMCH and 2FECH are each used as the solvent as in Examples 2-10 and 2-11.

The degree of the effect of suppressing the gas generation is correlated with the content of TFMCH in the mixture solvent. As understood from the results of Examples 2-5 through 2-9, as the amount of TFMCH increases, the total gas generation amount decreases. Where TFMCH is contained at 5% by weight or more, gas generation is significantly suppressed. Especially in Examples 2-5 through 2-8 in which TFMCH is contained at 10% by weight or more, the gas generation amount decreases to 1.09 $cm^3$ or less. From these results, it is understood that TFMCH is preferably contained in the solvent at 5% by weight or more, and more preferably at 10% by weight or more.

As described above, it is made clear that TFMCH, 12BTFMCH and 2FECH have a higher reliability than cyclic carbonates represented by PC or chain carbonates represented by EMC.

As shown in Table 2 and FIG. 3, 2FECH has the largest value of the highest occupied molecular orbit energy among the structures of the fluorine-containing cyclic saturated hydrocarbon, which is a solvent according to the present invention, in which one or more and two or less substituents R are introduced into the cyclohexane ring (in general formula (1), R is represented by $C_nX_{2n+1}$, X is F or H, and at least one of (2n+1) pieces of X's is F). Therefore, it is clear that any solvent according to the present invention of a molecular structure having a highest occupied molecular orbit energy smaller than that of 2FECH is superb in oxidation resistance and does not cause gas generation.

EXAMPLE 3

Lithium ion secondary batteries were created and the characteristics thereof were evaluated. Hereinafter, the results will be described. In this example, propylene carbonate was used as a compound having a dielectric constant of 25 or higher.

<Preparation of the Electrolytic Solution>

EXAMPLE 3-1

In Example 3-1, a plurality of types of mixture solvents with different weight ratios of propylene carbonate (PC) and trifluoromethylcyclohexane (TFMCH) were prepared. The weight ratios of the mixture solvents were 97:3, 95:5, 90:10, 85:15, and 75:25. Two samples of the mixture solvent of each weight ratio were created. In one of the samples, $LiPF_6$ of a concentration of 0.2 mol/L was dissolved. In the other sample, $LiPF_6$ of a concentration of 0.5 mol/L was dissolved. Thus, 10 types of electrolytic solutions A1, B1, C1, D1, E1, A2, B2, C2, D2 and E2 were obtained. Table 9 shows the sample names of the electrolytic solutions and the relationship thereof with the weight ratio and the concentration.

COMPARATIVE EXAMPLE 3-1

In a comparative example, two samples of electrolytic solutions containing only propylene carbonate (PC) as a solvent were prepared. In one of the samples, $LiPF_6$ of a concentration of 0.2 mol/L was dissolved. In the other sample, $LiPF_6$ of a concentration of 0.5 mol/L was dissolved. Thus, electrolytic solutions F1 and F2 were obtained.

CONVENTIONAL EXAMPLE 3-1

In a conventional example, two samples of electrolytic solutions containing a mixture solvent of propylene carbonate (PC) and dimethyl carbonate (DMC) mixed at a weight ratio of 75:25 were prepared. In one of the samples, $LiPF_6$ of a concentration of 0.2 mol/L was dissolved. In the other sample, $LiPF_6$ of a concentration of 0.5 mol/L was dissolved. Thus, electrolytic solutions G1 and G2 were obtained.

TABLE 9

| Name of sample | | Solvent | | $LiPF_6$ concentration |
|---|---|---|---|---|
| Example | Electrolytic solution A1 | PC:TFMCH | 97:3 | 0.2 mol/l |
| | Electrolytic solution B1 | | 95:5 | |
| | Electrolytic solution C1 | | 90:10 | |
| | Electrolytic solution D1 | | 85:15 | |
| | Electrolytic solution E1 | | 75:25 | |
| | Electrolytic solution A2 | PC:TFMCH | 97:3 | 0.5 mol/l |
| | Electrolytic solution B2 | | 95:5 | |
| | Electrolytic solution C2 | | 90:10 | |
| | Electrolytic solution D2 | | 85:15 | |
| | Electrolytic solution E2 | | 75:25 | |
| Comparative ex. | Electrolytic solution F1 | Only PC | — | 0.2 mol/l |
| | Electrolytic solution F2 | | | 0.5 mol/l |
| Conventional ex. | Electrolytic solution G1 | PC:DMC | 75:25 | 0.2 mol/l |
| | Electrolytic solution G2 | | | 0.5 mol/l |

<Fabrication of the Positive Electrode>

First, as the positive electrode active material, $LiCoO_2$ (average particle diameter: 10 μm; specific surface area by the BET method: 0.38 $m^2/g$) was prepared. To 100 parts by weight of the active material, 3 parts by weight of acetylene black as a conductor, 4 parts by weight of poly(vinylidene fluoride) as a binder, and an appropriate amount of N-methyl-2-pyrrolidone were added, stirred and mixed to obtain a slurry-like positive electrode mixer. The poly(vinylidene fluoride) was used in the state of being dissolved in N-methyl-2-pyrrolidone.

Next, as shown in FIG. 1C, the slurry-like positive electrode mixer 1b was applied on the surface of the current collector 1a formed of an aluminum foil having a thickness of 20 μm. The applied layer was dried and extended by a roller.

$LiCoO_2$ used as the positive electrode active material was prepared as follows. While a saturated aqueous solution of cobalt sulfate was stirred at a low rate, an alkaline solution having sodium hydroxide dissolved therein was dropped thereto to obtain a precipitate of $Co(OH)_2$. This precipitate was filtrated, washed with water, and heated to 80° C. in the air to be dried. The average particle diameter of the obtained hydroxide was about 10 μm.

Next, the obtained hydroxide was heat-treated at 380° C. for 10 hours in the air to obtain $Co_3O_4$, which is an oxide. It was confirmed by powder X ray diffraction analysis that the obtained oxide had a single phase.

In addition, the obtained oxide was mixed with powder of lithium carbonate such that the ratio of the Co molarity and the Li molarity would be 1.00:1.00. The resultant substance was heat-treated at 1000° C. for 10 hours in the dried air. Thus, the target $LiCoO_2$ was obtained. It was confirmed by a powder X ray diffraction analyzer (produced by Rigaku) that the obtained $LiCoO_2$ had a single-phase hexagonal layer structure. After pulverization and classification, the obtained $LiCoO_2$ was observed with a scanning electron microscope (produced by Hitachi High-Technologies Corporation) to confirm that the particle diameter was about 10 to 15 μm. The average particle diameter was obtained by a scattering-type particle size distribution analyzer (produced by HORIBA).

The obtained electrode plate was punched out into the size shown in FIG. 8A, and the positive electrode mixer 1b was removed from a tab, which was a lead attaching section. Thus, the positive electrode 1 was obtained. The positive electrode current collector 1a coated with the positive electrode mixer 1b has a rectangular shape of 30 mm×40 mm.

<Fabrication of the Negative Electrode>

A stainless steel (SUS304) mesh was punched out into the shown in FIG. 8B to form a negative electrode current collector 2a. The negative electrode current collector 2a includes an electrode section having a rectangular shape of 31 mm×41 mm and a lead attaching section having a square shape of 7 mm×7 mm. On the electrode section of the negative electrode current collector 2a, a metal lithium layer 2b having a thickness of 150 μm was pressure-contacted. Thus, the negative electrode 2 was obtained.

<Assembly>

The obtained positive electrode 1 and negative electrode 2 were stacked with the separator 3 interposed therebetween to create the electrode unit 13 as shown in FIG. 1C. As the separator, a polystyrene microporous sheet having a thickness of 20 μm was used.

Next, as shown in FIG. 1A, the positive electrode lead 11 formed of aluminum was welded to the positive electrode 1 of the electrode unit 13, and the negative electrode lead 12 formed of nickel was welded to the negative electrode 2. Then, the electrode unit 13 was put into the battery case 14 opened on three sides and formed of an aluminum laminate film having a thickness of 0.12 mm. The electrode unit 13 was fixed to the inside of the battery case 14 with a tape formed of PP. Openings including an opening through which the positive electrode lead 11 and the negative electrode lead 12 extended outside were thermally welded, and one opening was left opened without being welded. Thus, the battery case 14 was formed like a bag. Each of the electrolytic solutions A1 through G2 was injected through the opening not thermally welded. After the battery case 14 was treated with pressure reduction and deaeration, the opening was thermally welded in a reduced pressure state to seal the inside of the battery. From the electrolytic solutions A1, A2, B1, B2, C1, C2, D1, D2, E1, E2, F1, F2, G1 and G2, batteries A1, A2, B1, B2, C1, C2, D1, D2, E1, E2, F1, F2, G1 and G2 were obtained. Each battery had a thickness of 0.5 mm, a width of 50 mm and a height of 100 mm. The designed capacity of the battery when being charged at 4.3 V was 40 mAh.

<High Rate Discharge Characteristic>

The high rate discharge characteristic was evaluated using the created batteries A1, A2, B1, . . . , G2.

In an environment of 25° C., each battery was treated with constant current charge at a current value of 2 mA until the voltage became 4.3V, and then treated with constant voltage charge at 4.3V until the current value was attenuated to 0.4 mA. Then, the battery was treated with constant current discharge at a current value of 0.4 mA until the voltage became 3.0V. The discharge capacity obtained at this point was set as the initial discharge capacity. Next, the battery was treated with constant current charge at a current value of 2 mA until the voltage became 4.3V, and then treated with constant voltage charge at 4.3V until the current value was attenuated to 0.4 mA. Then, the battery was treated with constant current discharge at a current value of 0.4 mA until the voltage became 3.0V. The discharge capacity obtained at this point was set as the high rate discharge capacity. The ratio of the high rate discharge capacity with respect to the initial discharge capacity for each battery is set as the high rate discharge characteristic (high rate discharge characteristic=high rate discharge capacity/initial discharge capacity) and the percentage thereof is shown in Table 10.

<High Temperature Storage>

Using each of the created batteries, a high temperature storage test was performed.

In an environment of 25° C., each battery was treated with constant current charge at a current value of 2 mA until the voltage became 4.3V, and then treated with constant voltage charge at 4.3V until the current value was attenuated to 0.4 mA. Then, the charged batteries A1, A2, B1, . . . , G2 were maintained in an environment of a constant temperature oven of 85° C. for 3 days. It is considered that if the solvent contained in the electrolytic solution is oxidized and decomposed during this period, $CO_2$ is generated. Then, the batteries A1, A2, B1, . . . , G2 were taken out from the constant temperature oven, and the generated gas was quantized and component analysis was performed by gas chromatography. Table 10 shows the $CO_2$ generation amount calculated from the results.

TABLE 10

| | Battery | High rate discharge characteristic (%) | $CO_2$ generation amount (ml) |
|---|---|---|---|
| Example 3-1 | A1 | 74 | 0.86 |
| | B1 | 80 | 0.65 |
| | C1 | 83 | 0.61 |
| | D1 | 85 | 0.58 |
| | E1 | 87 | 0.51 |
| | A2 | 78 | 0.79 |
| | B2 | 84 | 0.60 |
| | C2 | 87 | 0.57 |
| | D2 | 88 | 0.53 |
| | E2 | 89 | 0.47 |
| Comparative Example 3-1 | F1 | 65 | 1.17 |
| | F2 | 68 | 1.10 |
| Conventional Example 3-1 | G1 | 92 | 2.18 |
| | G2 | 96 | 1.99 |

As shown in Table 10, in the batteries F1 and F2 in Comparative Example 3-1 which do not contain dimethyl carbonate (DMC), the $CO_2$ generation is more suppressed as compared with in the batteries G1 and G2 in Conventional Example 3-1 which contain dimethyl carbonate (DMC), but the high rate discharge characteristic is significantly reduced in the batteries F1 and F2. In the batteries A1, B1, . . . , E2 in Example 3-1, the $CO_2$ generation is more suppressed than in the batteries F1 and F2 in Comparative Example 3-1. From these results, it is understood that oxidation is suppressed where TFMCH is contained even in a small amount. In the batteries A1, B1, . . . , E2 in Example 3-1, the high rate discharge characteristic is also improved as compared with in the batteries F1 and F2 in Comparative Example 3-1.

Especially, among the batteries in Example 3-1, the batteries containing trifluoromethylcyclohexane (TFMCH) at 5% by weight or more (B1, C1, D1, E1, B2, C2, D2, E2), the $CO_2$ generation is significantly suppressed as compared with the batteries containing trifluoromethylcyclohexane at 3% by weight (A1, A2). In the batteries containing trifluoromethylcyclohexane at 5% by weight or more, the $CO_2$ generation amount slowly decreases from 0.65 ml. As understood from this, the oxidation of the electrolytic solution is effectively suppressed where trifluoromethylcyclohexane is contained at 5% by weight or more.

Meanwhile, among the batteries in Example 3-1, the batteries containing trifluoromethylcyclohexane at 10% by weight or more (C1, D1, E1, C2, D2, E2), the high rate discharge characteristic slowly increases from 83%. As understood from this, especially superb high rate discharge characteristic is obtained where trifluoromethylcyclohexane is contained at 10% by weight or more.

From the above results, the fluorine-containing cyclic saturated hydrocarbon compound is preferably contained in the solvent at 5% by weight or more, and more preferably at 10% by weight or more.

EXAMPLE 4

Like in Example 3, lithium ion secondary batteries were created and the characteristics thereof were evaluated. Hereinafter, the results will be described. In this example, sulfone was used as a compound having a dielectric constant of 25 or higher.

<Preparation of the Nonaqueous Electrolytic Solution>

EXAMPLE 4-1

In Example 4-1, nonaqueous electrolytic solutions were prepared using sulfolane (SLF), 3-methylsulfolane (3-MeSLF) or iropropylmethylsulfone (iPrMeSF) as the sulfone, trifluoromethylcyclohexane (TFMCH) or 1,2-bis(trifluoromethyl)cyclohexane (12BTFMCH) as the fluorine-containing cyclic saturated hydrocarbon compound, and lithium hexafluorophosphate ($LiPF_6$) as the supporting electrolyte salt. Tables 11, 12 and 13 show the sample names and the composition ratios of the prepared nonaqueous electrolytic solutions. The mixing ratio of the solvent is weight ratio, and the concentration of the supporting electrolyte salt is represented by mol/L. As TFMCH and 12BTFMCH, the materials respectively purified or synthesized in Example 1 were used. The other solvents and supporting electrolyte salts were of commercially available battery grade.

TABLE 11

| Name of nonaqueous electrolytic solution | Mixing ratio of solvent (% by weight) | | Concentration of support electrolyte salt (mol/L) |
|---|---|---|---|
| | 3-MeSLF | TFMCH | $LiPF_6$ |
| A1-1 | 97.0 | 3.0 | 0.2 |
| A1-2 | 97.0 | 3.0 | 0.4 |
| A2-1 | 95.0 | 5.0 | 0.2 |
| A2-2 | 95.0 | 5.0 | 0.4 |
| A3-1 | 90.0 | 10.0 | 0.2 |
| A3-2 | 90.0 | 10.0 | 0.4 |
| A3-3 | 90.0 | 10.0 | 1.0 |
| A4-1 | 75.0 | 25.0 | 0.2 |
| A4-2 | 75.0 | 25.0 | 0.4 |
| A5-1 | 60.0 | 40.0 | 0.2 |
| A5-2 | 60.0 | 40.0 | 0.4 |

TABLE 12

| Name of nonaqueous electrolytic solution | Mixing ratio of solvent (% by weight) | | Concentration of supporting electrolyte salt (mol/L) |
| --- | --- | --- | --- |
| | iPrMeSF | TFMCH | LiPF$_6$ |
| B3-1 | 90.0 | 10.0 | 0.2 |
| B3-2 | 90.0 | 10.0 | 0.4 |
| B4-1 | 75.0 | 25.0 | 0.2 |
| B4-2 | 75.0 | 25.0 | 0.4 |
| B5-1 | 60.0 | 40.0 | 0.2 |
| B5-2 | 60.0 | 40.0 | 0.4 |

TABLE 13

| Name of nonaqueous electrolytic solution | Mixing ratio of solvent (% by weight) | | Concentration of supporting electrolyte salt (mol/L) |
| --- | --- | --- | --- |
| | SLF | 12BTFMCH | LiPF$_6$ |
| C3-1 | 90.0 | 10.0 | 0.2 |
| C3-2 | 90.0 | 10.0 | 0.4 |
| C4-1 | 75.0 | 25.0 | 0.2 |
| C4-2 | 75.0 | 25.0 | 0.4 |
| C5-1 | 60.0 | 40.0 | 0.2 |
| C5-2 | 60.0 | 40.0 | 0.4 |
| C6-1 | 40.0 | 60.0 | 0.2 |
| C6-2 | 40.0 | 60.0 | 0.4 |

COMPARATIVE EXAMPLE 4-1

In Comparative Example 4-1, nonaqueous electrolytic solutions containing only propylene carbonate (PC), sulfolane, 3-methylsulfolane or iropropylmethylsulfone as the solvent were prepared. Table 14 shows the sample names of the prepared nonaqueous electrolytic solutions, and the concentrations of the supporting electrolyte salts represented by mol/L. The solvents and supporting electrolyte salt used were all of commercially available battery grade.

TABLE 14

| Name of nonaqueous electrolytic solution | Solvent | Concentration of supporting electrolyte salt (mol/L) LiPF$_6$ |
| --- | --- | --- |
| E-1 | PC | 0.2 |
| E-2 | PC | 0.4 |
| F-1 | 3-MeSLF | 0.2 |
| F-2 | 3-MeSLF | 0.4 |
| G-1 | iPrMeSF | 0.2 |
| G-2 | iPrMeSF | 0.4 |
| H-1 | SLF | 0.2 |
| H-2 | SLF | 0.4 |

CONVENTIONAL EXAMPLE 4-1

In Conventional Example 4-1, nonaqueous electrolytic solutions containing a mixture solvent of propylene carbonate and dimethyl carbonate (DMC) mixed at a ratio of 75:25 were prepared. Table 15 shows the sample names of the prepared nonaqueous electrolytic solutions, and the concentrations of the supporting electrolyte salt represented by mol/L. The solvents and supporting electrolyte salt used were all of commercially available battery grade.

TABLE 15

| Name of nonaqueous electrolytic solution | Mixing ratio of solvent (% by weight) | | Concentration of supporting electrolyte salt (mol/L) |
| --- | --- | --- | --- |
| | PC | DMC | LiPF$_6$ |
| I-1 | 75.0 | 25.0 | 0.2 |
| I-2 | 75.0 | 25.0 | 0.4 |

<Fabrication of the Positive Electrode>

First, as the positive electrode active material, LiCoO$_2$ (average particle diameter: 10 μm; specific surface area by the BET method: 0.38 m$^2$/g) was prepared. To 100 parts by weight of the active material, 3 parts by weight of acetylene black as a conductor, 4 parts by weight of poly(vinylidene fluoride) as a binder, and an appropriate amount of N-methyl-2-pyrrolidone were added, stirred and mixed to obtain a slurry-like positive electrode mixer. The poly(vinylidene fluoride) was used in the state of being dissolved in N-methyl-2-pyrrolidone.

Next, as shown in FIG. 1C, the slurry-like positive electrode mixer 1b was applied on the surface of the current collector 1a formed of an aluminum foil having a thickness of 20 μm. The applied layer was dried and extended by a roller.

LiCoO$_2$ used as the positive electrode active material was prepared as follows. While a saturated aqueous solution of cobalt sulfate was stirred at a low rate, an alkaline solution having sodium hydroxide dissolved therein was dropped thereto to obtain a precipitate of Co(OH)$_2$. This precipitate was filtrated, washed with water, and heated to 80° C. in the air to be dried. The average particle diameter of the obtained hydroxide was about 10 μm.

Next, the obtained hydroxide was heat-treated at 380° C. for 10 hours in the air to obtain CO$_3$O$_4$, which is an oxide. It was confirmed by powder X ray diffraction analysis that the obtained oxide had a single phase.

In addition, the obtained oxide was mixed with powder of lithium carbonate such that the ratio of the Co molarity and the Li molarity would be 1.00:1.00. The resultant substance was heat-treated at 1000° C. for 10 hours in dried air. Thus, the target LiCoO$_2$ was obtained. It was confirmed by a powder X ray diffraction analyzer (produced by Rigaku) that the obtained LiCoO$_2$ had a single-phase hexagonal layer structure. After pulverization and classification, the obtained LiCoO$_2$ was observed with a scanning electron microscope (produced by Hitachi High-Technologies Corporation) to confirm that the particle diameter was about 10 to 15 μm. The average particle diameter was obtained by a scattering-type particle size distribution analyzer (produced by HORIBA).

The obtained electrode plate was punched out into the size shown in FIG. 8A, and the positive electrode mixer 1b was removed from a tab, which was a lead attaching section. Thus, the positive electrode 1 was obtained. The positive electrode current collector 1a coated with the positive electrode mixer 1b has a rectangular shape of 30 mm×40 mm.

<Fabrication of the Negative Electrode>

A stainless steel (SUS304) mesh was punched out into the size shown in FIG. 8B to form a negative electrode current collector 2a. The negative electrode current collector 2a includes an electrode section having a rectangular shape of 31 mm×41 mm and a lead attaching section having a square shape of 7 mm×7 mm. On the electrode section of the negative electrode current collector 2a, a metal lithium layer 2b having a thickness of 150 μm was pressure-contacted. Thus, the negative electrode 2 was obtained.

<Assembly>

The obtained positive electrode 1 and negative electrode 2 were stacked with the separator 3 interposed therebetween to create the electrode unit 13 as shown in FIG. 1C. As the separator, a polystyrene microporous sheet having a thickness of 20 μm was used.

Next, as shown in FIG. 1A, the positive electrode lead 11 formed of aluminum was welded to the positive electrode 1 of the electrode unit 13, and the negative electrode lead 12 formed of nickel was welded to the negative electrode 2. Then, the electrode unit 13 was put into the battery case 14 opened on three sides and formed of an aluminum laminate film having a thickness of 0.12 mm. The electrode unit 13 was fixed to the inside of the battery case 14 with a tape formed of PP. Openings including an opening through which the positive electrode lead 11 and the negative electrode lead 12 extended outside were thermally welded, and one opening was left opened without being welded. Thus, the battery case 14 was formed like a bag. Each of the electrolytic solutions prepared as the electrolytic solution 15 was injected through the opening not thermally welded. After the battery case 14 was treated with pressure reduction and deaeration, the opening was thermally welded in a reduced pressure state to seal the inside of the battery. Table 16 shows the relationship between the name of the electrolytic solution and the name of the obtained battery. Each battery had a thickness of 0.5 mm, a width of 50 mm and a height of 100 mm. The designed capacity of the battery when being charged at 4.3V was 40 mAh.

TABLE 16

|  | Name of electrolytic solution | Name of battery |
|---|---|---|
| Example 4-1 | A4-1 | A4-1 |
|  | B4-1 | B4-1 |
|  | C4-1 | C4-1 |
|  | D4-1 | D4-1 |
| Comparative Example 4-1 | F-1 | F-1 |
|  | G-1 | G-1 |
|  | H-1 | H-1 |
| Conventional Example 4-1 | I-1 | I-1 |

<Ion Conductivity>

The ion conductivity of the prepared electrolytic solutions in the example and the comparative example was measured.

In an environment of 22° C., the conductivity was measured by an electric conductivity meter (produced by DKK-Toa Corporation). Table 17 shows the results.

TABLE 17

|  | Electrolytic solution | Conductivity (ms/m) |
|---|---|---|
| Example 4-1 | A1-1 | 87 |
|  | A1-2 | 133 |
|  | A2-1 | 89 |
|  | A2-2 | 136 |
|  | A3-1 | 93 |
|  | A3-2 | 140 |
|  | A3-3 | 157 |
|  | A4-1 | 99 |
|  | A4-2 | 145 |
|  | A5-1 | 92 |
|  | A5-2 | 142 |
|  | B3-1 | 108 |
|  | B3-2 | 152 |

TABLE 17-continued

|  | Electrolytic solution | Conductivity (ms/m) |
|---|---|---|
|  | B4-1 | 121 |
|  | B4-2 | 161 |
|  | B5-1 | 118 |
|  | B5-2 | 160 |
|  | C3-1 | 115 |
|  | C3-2 | 180 |
|  | C4-1 | 118 |
|  | C4-2 | 182 |
|  | C5-1 | 120 |
|  | C5-2 | 182 |
|  | C6-1 | 116 |
|  | C6-2 | 180 |
| Comparative Example 4-1 | F-1 | 83 |
|  | F-2 | 128 |
|  | G-1 | 90 |
|  | G-2 | 129 |
|  | H-1 | 109 |
|  | H-2 | 174 |

<High Rate Discharge Characteristic>

The high rate discharge characteristic of the created batteries in the example, the comparative example and the conventional example was evaluated.

In an environment of 25° C., each battery was treated with constant current charge at a current value of 1 mA until the voltage became 4.3V, and then treated with constant voltage charge at 4.3V until the current value was attenuated to 0.4 mA. Then, the battery was treated with constant current discharge at a current value of 0.4 mA until the voltage became 3.0V. The discharge capacity obtained at this point was set as the initial discharge capacity. Next, the battery was treated with constant current charge at a current value of 1 mA until the voltage became 4.3V, and then treated with constant voltage charge at 4.3V until the current value was attenuated to 0.4 mA. Then, the battery was treated with constant current discharge at a current value of 2 mA until the voltage became 3.0V. The discharge capacity obtained at this point was set as the high rate discharge capacity. The ratio of the high rate discharge capacity with respect to the initial discharge capacity for each evaluated battery is set as the high rate discharge characteristic (high rate discharge characteristic=high rate discharge capacity/initial discharge capacity) and the percentage thereof is shown in Table 18. Table 18 also shows the initial discharge capacity of each battery converted into the capacity per unit weight.

TABLE 18

|  | Name of battery | Initial discharge capacity (mAh/g(positive electrode mixer)) | High rate discharge characteristic (%) |
|---|---|---|---|
| Example 4-1 | A4-1 | 149 | 60 |
|  | B4-1 | 147 | 61 |
|  | C4-1 | 148 | 82 |
| Comparative Example 4-1 | F-1 | 147 | 41 |
|  | G-1 | 146 | 36 |
|  | H-1 | — | — |
| Conventional Example 4-1 | I-1 | 148 | 99 |

<High Temperature Storage>

Using each of the created batteries, a high temperature storage test was performed.

In an environment of 25° C., each battery was treated with constant current charge at a current value of 1 mA until the voltage became 4.3V, and then treated with constant voltage charge at 4.3V until the current value was attenuated to 0.4 mA. Then, the charged batteries were stored in an environment of a constant temperature oven of 85° C. for 3 days. It is considered that if the solvent contained in the electrolytic solution is oxidized and decomposed during this period, $CO_2$ is generated. Then, the batteries were taken out from the constant temperature oven, and the generated gas was quantized and component analysis was performed by gas chromatography. Table 19 shows the $CO_2$ generation amount calculated from the results.

TABLE 19

| | | Solvent for electrolytic solution | $CO_2$ generation amount (ml) |
|---|---|---|---|
| Example 4-1 | A4-1 | 3-MeSLF:TFMCH = 3:1 | 0.02 |
| | B4-1 | iPrMeSF:TFMCH = 3:1 | 0.01 |
| | C4-1 | SLF:12BTFMCH = 3:1 | 0.01 |
| Comparative Example 4-1 | E-1 | PC | 1.17 |
| | F-1 | 3-MeSLF | 0.01 |
| | G-1 | iPrMeSF | 0.01 |
| | H-1 | SLF | — |
| Conventional Example 4-1 | I-1 | PC:DMC = 3:1 | 2.18 |

As shown in Table 19, in the batteries according to the present invention which do not contain carbonate, $CO_2$ is not generated even in a high temperature storage state where the positive electrodes in a charged state coexist. This means that the effect of suppressing gas is provided. By contrast, in the battery E-1 in the comparative example using PC and in the battery I-1 in the conventional example using a mixture solvent of PC and DMC, a large amount of $CO_2$ is generated. It is understood that the present invention can reduce the oxidation of the solvent and the generation of gas caused by the oxidation of the solvent.

Also in the batteries F-1, G-1 and H-1 in the comparative example using only a sulfone, $CO_2$ is not generated. However, as shown in Table 17, the ion conductivity is smaller in the electrolytic solutions using only a sulfone as the solvent (F-1, F-2, G-1, G-2, H-1, H-2) than in the electrolytic solutions using a solvent also containing fluorine-containing cyclic saturated hydrocarbon. A sulfone is a solvent having a relatively high viscosity, and this is considered to be one factor which decreases the ion conductivity. Nevertheless, mixing a sulfone with fluorine-containing cyclic saturated hydrocarbon provides an effect of decreasing the viscosity. It can be presumed that the ion conductivity is increased as a result thereof.

Based on the discharge characteristic of each batterie-shown in Table 18, regarding the initial discharge capacity, both of the batteries using an electrolytic solution containing only a sulfone as a solvent and the batteries using an electrolytic solution containing, as a solvent, a mixture of a sulfone and fluorine-containing cyclic saturated hydrocarbon are equivalent to the battery in the conventional example using an electrolytic solution containing a carbonate as a solvent. However, regarding the high rate discharge characteristic, the batteries using an electrolytic solution containing, as a solvent, a mixture of fluorine-containing cyclic saturated hydrocarbon and a sulfone is superior to the batteries using an electrolytic solution containing only a sulfone as the solvent.

It is understood that mixing fluorine-containing cyclic saturated hydrocarbon and a sulfone provides an effect of improving the ion conductivity.

A battery was created using an electrolytic solution containing sulfolane, which is a sulfone, as the solvent. However, the wettability of the electrodes and the separator was too low for the electrolytic solution to sufficiently permeate at the time of injection. Therefore, charge/discharge was not performed on this type of battery. By contrast, an electrolytic solution using a mixture solvent of sulfolane and 1,2-bis (trifluoromethyl)cyclohexane had a good wettability and exhibited a superb charge/discharge characteristic. By using a mixture solvent with fluorine-containing cyclic saturated hydrocarbon in this manner, good results are provided also in terms of wettability and liquid permeability.

From the above-described results, by using a solvent containing a fluorine-containing cyclic saturated hydrocarbon compound and a sulfone as the solvent for the electrolytic solution, a nonaqueous electrolytic solution secondary battery which has a superb oxidation resistance, generates little gas, and has a good charge/discharge characteristic can be obtained.

Example 5

Electrical double layer capacitors were created using propylene carbonate as a compound having a dielectric constant of 25 or higher, and the characteristics thereof were evaluated. Hereinafter, the results will be described.

<Preparation of the Electrolytic Solution>

Example 5

In Example 5, a mixture solvent was prepared by mixing propylene carbonate (PC) and trifluoromethylcyclohexane (TFMCH) at a weight ratio of 80:20. In this mixture solvent, $(C_2H_5)_4NBF_4$ was dissolved at a concentration of 0.2 mol/L. Thus, an electrolytic solution J was obtained.

Comparative Example 5

In Comparative Example 5, an electrolytic solution containing only propylene carbonate (PC) as the solvent was prepared. In this solvent, $(C_2H_5)_4NBF_4$ was dissolved at a concentration of 0.2 mol/L. Thus, an electrolytic solution K was obtained.

<Creation of the Electrode>

The electrode was created using activated carbon powder (specific surface area: 1700 $m^2$/g; average particle diameter: 2 μm). 100 mg of activated carbon powder and 20 mg of acetylene black were mixed uniformly, and 20 mg of polyvinylpyrrolidone and 800 mg of methanol were added thereto, to obtain a slurry. This slurry-like electrode mixer was applied on the current collector formed of an aluminum foil and dried in vacuum. The weight of the electrode mixer applied was 2.2 mg/$cm^2$ of the current collector. The obtained electrode plate was punched out into a disc having a diameter of 12.5 mm to form an electrode.

<Assembly>

Using the obtained disc-shaped electrode, a coin-type electrical double layer capacitor as shown in FIG. 2 was assembled. First, the electrodes 22a and 22b were located so as to face each other while interposing the separator 17 formed of a polypropylene nonwoven cloth sheet punched out into a circle having a diameter of 15 mm. Thus, the electrode unit was formed. The electrode unit was put into a case 20. After the inside of the case 21 was impregnated with a prescribed amount of the electrolytic solution J or K, the inside of the capacitor was sealed with a sealing plate 19 provided with a gasket 20. Thus, an electrical double layer capacitor J using the electrolytic solution J and an electrical double layer capacitor K using the electrolytic solution K were created.

<Charge/Discharge Test>

Figure 9A:
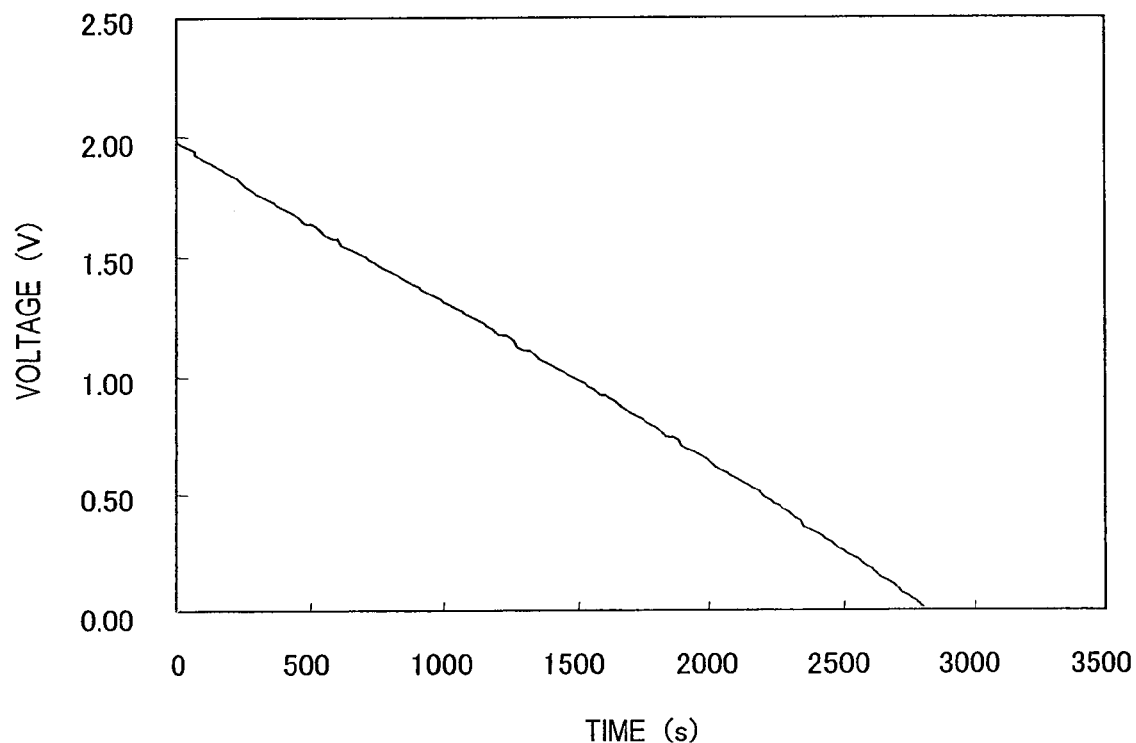
FIG. 9A and FIG. 9B are graphs showing the charge/discharge characteristic of electrical double layer capacitors respectively in Example 5 and Comparative Example 5.

In an environment of 25° C., the created electrical double layer capacitors J and K were subjected to a charge/discharge test at a constant current of 0.1 mA in the voltage range of 0 V to 2.0 V. FIG. 9A shows the results of the charge/discharge test conducted on the electrical double layer capacitor J, and FIG. 9B shows the results of the charge/discharge test conducted on the electrical double layer capacitor K.

Figure 9B:
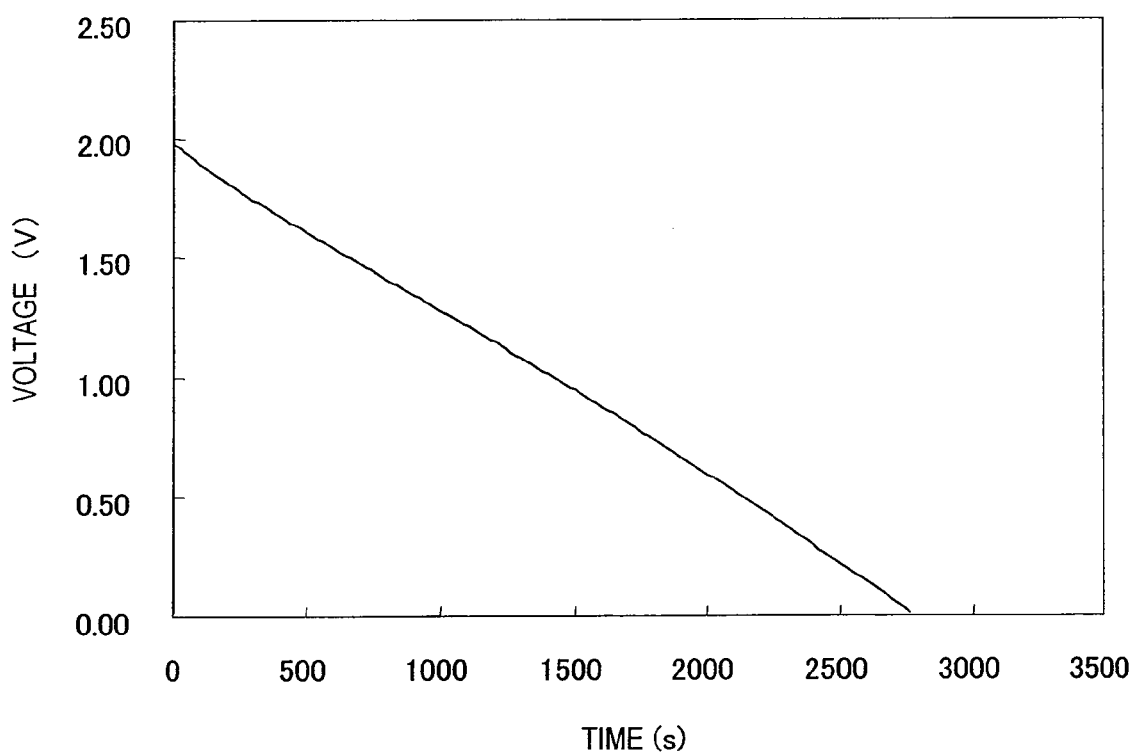

As shown in FIG. 9A and FIG. 9B, both in the case where the electrical double layer capacitor J in the example is used and in the case where the electrical double layer capacitor K in the comparative example is used, substantially the same characteristic is exhibited. It is understood that a nonaqueous electrolytic solvent and a nonaqueous electrolytic solution according to the present invention are preferably usable also in an electrical double layer capacitor.

A main purpose of this example was to confirm that an electrical double layer capacitor equivalent to or higher than the conventional electrical double layer capacitor can be created using a nonaqueous electrolytic solvent and a nonaqueous electrolytic solution for an electricity storage device according to the present invention. Therefore, the created electrical double layer capacitors were not subjected to a high temperature storage test. Nonetheless, in the electrolytic solution in Example 5, like in the electrolytic solutions in Example 3, the oxidation reaction is suppressed in a high potential state. Therefore, the electrical double layer capacitor in Example 5 is highly reliable.

Example 6

Electrical double layer capacitors were created using sulfone as a compound having a dielectric constant of 25 or higher, and the characteristics thereof were evaluated like in Example 5. Hereinafter, the results will be described.

<Preparation of the Electrolytic Solution>

Example 6

In Example 6, a mixture solvent was prepared by mixing sulfolane (SLF) and 1,2-bis(trifluoromethyl)cyclohexane (12BTFMCH) at a weight ratio of 3:1. In this mixture solvent, $(C_2H_5)_4NBF_4$ was dissolved at a concentration of 0.2 mol/L. Thus, an electrolytic solution L was obtained.

Comparative Example 6

In Comparative Example 6, an electrolytic solution containing only propylene carbonate (PC) as the solvent was prepared. In this solvent, $(C_2H_5)_4NBF_4$ was dissolved at a concentration of 0.2 mol/L. Thus, an electrolytic solution M was obtained.

<Fabrication of the Electrode>

The electrode was created using activated carbon powder (specific surface area: 1700 $m^2$/g; average particle diameter: 2 μm). 100 mg of activated carbon powder and 20 mg of acetylene black were mixed uniformly, and 20 mg of polyvinylpyrrolidone and 800 mg of methanol were added thereto, to obtain a slurry. This slurry-like electrode mixer was applied on the current collector formed of an aluminum foil and dried in vacuum. The weight of the electrode mixer applied was 2.2 mg/$cm^2$ of the current collector. The obtained electrode plate was punched out into a disc having a diameter of 12.5 mm to form an electrode.

<Assembly>

Using the obtained disc-shaped electrode, a coin-type electrical double layer capacitor as shown in FIG. 2 was assembled. First, the electrodes 22a and 22b were located so as to face each other while interposing the separator 17 formed of a polypropylene nonwoven cloth sheet punched out into a circle having a diameter of 15 mm. Thus, the electrode unit was formed. The electrode unit was put into a case 21. After the inside of the case 21 was impregnated with a prescribed amount of the electrolytic solution L or M, the inside of the capacitor was sealed with a sealing plate 19 provided with a gasket 20. Thus, an electrical double layer capacitor L using the electrolytic solution L and an electrical double layer capacitor M using the electrolytic solution M were created.

<Charge/Discharge Test>

In an environment of 25° C., the created electrical double layer capacitors L and M were subjected to a charge/discharge test at a constant current of 0.1 mA in the voltage range of 0V to 2.0V. FIG. 1A shows the results of the charge/discharge test conducted on the electrical double layer capacitor in Example 6, and FIG. 10B shows the results of the charge/discharge test conducted on the electrical double layer capacitor in Comparative Example 6.

Figure 10A:
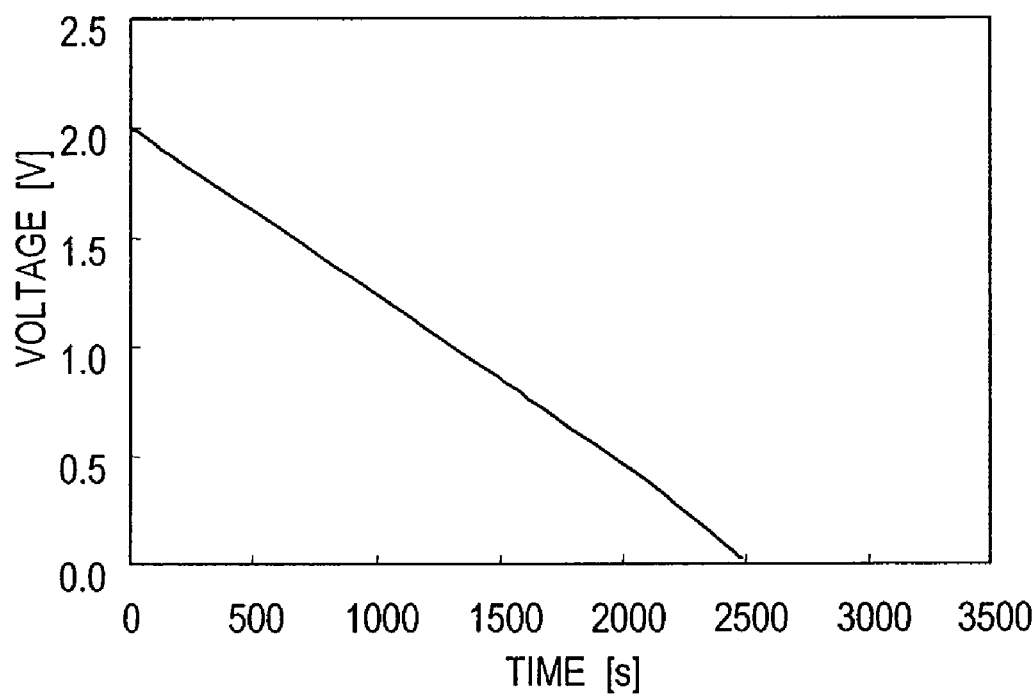
FIG. 10A and FIG. 10B are graphs showing the charge/discharge characteristic of electrical double layer capacitors respectively in Example 6 and Comparative Example 6.
Figure 10B:
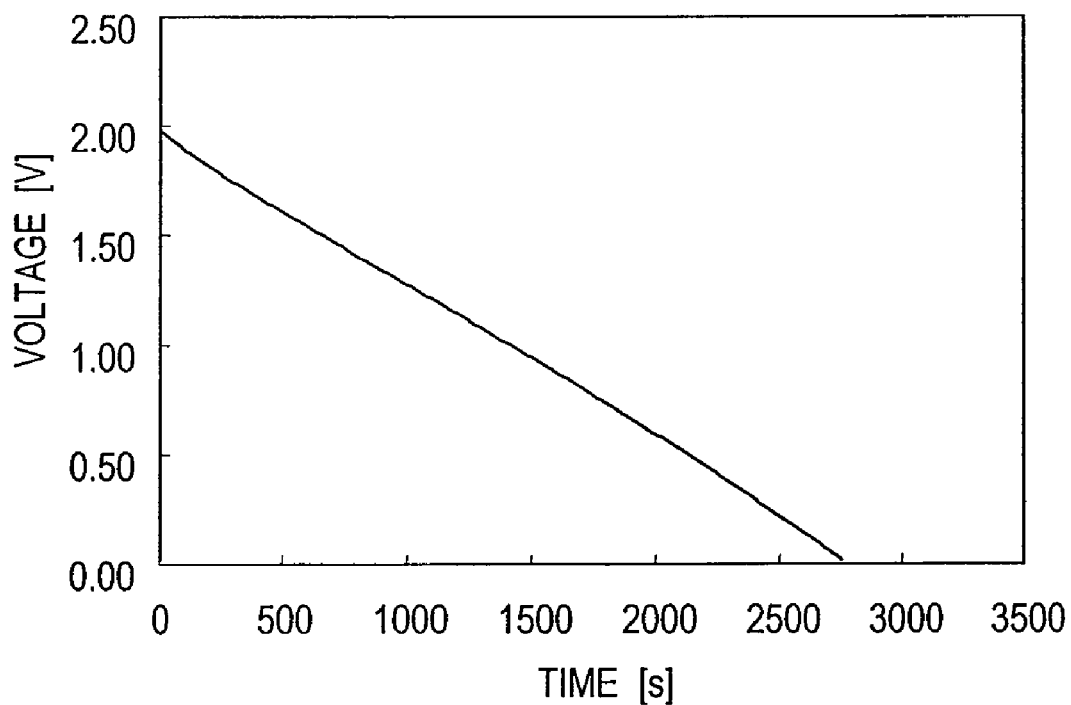

As shown in FIG. 1A and FIG. 10B, both in the case where the electrical double layer capacitor in Example 6 is used and in the case where the electrical double layer capacitor in Comparative Example 6 is used, substantially the same characteristic is exhibited. It is understood that a nonaqueous electrolytic solvent and a nonaqueous electrolytic solution for an electricity storage device according to the present invention are preferably usable also in an electrical double layer capacitor.

A main purpose of this example was to confirm that an electrical double layer capacitor equivalent to or higher than the conventional electrical double layer capacitor can be created using a nonaqueous electrolytic solvent and a nonaqueous electrolytic solution for an electricity storage device according to the present invention. Therefore, the created electrical double layer capacitors were not subjected to a high temperature storage test. Nonetheless, in the electrolytic solution in Example 6, like in the electrolytic solutions in Example 4, the oxidation reaction is suppressed in a high potential state. Therefore, the electrical double layer capacitor in Example 6 is highly reliable.

A nonaqueous solvent for an electricity storage device according to the present invention is useful as a solvent for an electrolytic solution for embodying a super high voltage nonaqueous electricity storage device having a high energy density. The nonaqueous solvent for an electricity storage device according to the present invention is also usable as a solvent for a conventional voltage type lithium ion secondary battery or electrical double layer capacitor, in which case a high reliability is provided at a high temperature. The nonaqueous solvent for an electricity storage device according to the present invention is especially preferable as a solvent for an electrolytic solution of a large scale battery or an electric vehicle battery, which are required to have a high reliability.

What is claimed is:

1. A nonaqueous solvent for an electricity storage device comprising fluorine-containing cyclic saturated hydrocarbon which is cyclohexane having one or two substituents R introduced into a cyclohexane ring, wherein R is represented by $C_nX_{2n+1}$, n is 1 or 2, at least one X is F, and other X are F or H.

2. The nonaqueous solvent for an electricity storage device of claim 1, further comprising a compound having a relative dielectric constant of 25 or higher.

3. The nonaqueous solvent for an electricity storage device of claim 2, wherein the compound having a relative dielectric constant of 25 or higher is a carbonate or a sulfone.

4. The nonaqueous solvent for an electricity storage device of claim 3, wherein the compound having a relative dielectric constant of 25 or higher is a cyclic carbonate.

5. The nonaqueous solvent for an electricity storage device of claim 3, wherein the compound having a relative dielectric constant of 25 or higher is a sulfone compound represented by general formula (2) below

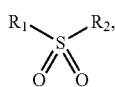

(2)

wherein $R_1$ and $R_2$ are independently an alkyl group having a carbon number of 1 or greater and 4 or smaller, and may be bonded to each other to form a cyclic structure.

6. The nonaqueous solvent for an electricity storage device of claim 5, wherein the sulfone compound is formed of at least one of a chain sulfone and a cyclic sulfone.

7. The nonaqueous solvent for an electricity storage device of claim 6, wherein the chain sulfone is an asymmetric chain sulfone.

8. The nonaqueous solvent for an electricity storage device of claim 1, wherein the fluorine-containing cyclic saturated hydrocarbon is contained as a solvent component at 10% by weight or greater and 100% by weight or less.

9. A nonaqueous electrolytic solution for an electricity storage device, comprising:
the nonaqueous solvent for an electricity storage device of claim 1; and
a supporting electrolyte salt.

10. The nonaqueous electrolytic solution for an electricity storage device of claim 9, wherein the supporting electrolyte salt is a lithium salt.

11. The nonaqueous electrolytic solution for an electricity storage device of claim 9, wherein the supporting electrolyte salt is a quaternary ammonium salt.

12. An electricity storage device, comprising the nonaqueous solvent of claim 1.

13. A lithium ion secondary battery, comprising the nonaqueous solvent of claim 1.

14. An electrical double layer capacitor, comprising the nonaqueous solvent of claim 1.

15. The nonaqueous solvent for an electrical storage device according to claim 1, wherein the fluorine-containing cyclic saturated hydrocarbon comprises trifluoromethylcyclohexane.

* * * * *